US008452076B2

(12) United States Patent
Nakagaki et al.

(10) Patent No.: US 8,452,076 B2
(45) Date of Patent: *May 28, 2013

(54) DEFECT CLASSIFIER USING CLASSIFICATION RECIPE BASED ON CONNECTION BETWEEN RULE-BASED AND EXAMPLE-BASED CLASSIFIERS

(75) Inventors: Ryo Nakagaki, Kawasaki (JP); Masaki Kurihara, Yokohama (JP); Toshifumi Honda, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,181

(22) Filed: Jan. 31, 2012

(65) Prior Publication Data
US 2012/0128233 A1   May 24, 2012

Related U.S. Application Data

(63) Continuation of application No. 13/183,488, filed on Jul. 15, 2011, now Pat. No. 8,150,141, which is a continuation of application No. 11/704,350, filed on Feb. 9, 2007, now Pat. No. 7,991,217.

(30) Foreign Application Priority Data

Feb. 27, 2006   (JP) ................................. 2006-049487

(51) Int. Cl.
*G06K 9/00*   (2006.01)
*G06T 7/00*   (2006.01)

(52) U.S. Cl.
CPC ............... *G06T 7/0006* (2013.01); *G06T 7/001* (2013.01); *G06T 2207/30148* (2013.01); *G06T 2207/10061* (2013.01)

USPC .......................................... 382/149; 382/144

(58) Field of Classification Search
None
See application file for complete search history.

(56) References Cited

U.S. PATENT DOCUMENTS

| 6,922,482 B1 | 7/2005 | Ben-Porath et al. |
| 6,987,873 B1 | 1/2006 | Ben-Porath et al. |
| 7,062,081 B2 | 6/2006 | Shimoda et al. |

(Continued)

FOREIGN PATENT DOCUMENTS

| JP | 2001-135692 | 5/2001 |
| JP | 2004-47939 | 2/2004 |
| JP | 2004-294360 | 10/2004 |

OTHER PUBLICATIONS

Office Action issued in Japanese Patent Application No. 2006-049487 on Aug. 3, 2010.

*Primary Examiner* — Barry Drennan
(74) *Attorney, Agent, or Firm* — Antonelli, Terry, Stout & Kraus, LLP.

(57) ABSTRACT

In apparatuses for automatically acquiring and also for automatically classifying images of defects present on a sample such as a semiconductor wafer, a classifying system is provided which are capable of readily accepting even such a case that a large number of classification classes are produced based upon a request issued by a user, and also even such a case that a basis of the classification class is changed in a high frequency. When the user defines the classification classes, a device for designating attributes owned by the respective classification classes is provided. The classifying system automatically changes a connecting mode between an internally-provided rule-based classifier and an example-based classifier, so that such a classifying system which is fitted to the classification basis of the user is automatically constructed.

4 Claims, 18 Drawing Sheets

U.S. PATENT DOCUMENTS

| | | | |
|---|---|---|---|
| 7,991,217 B2* | 8/2011 | Nakagaki et al. | 382/149 |
| 8,150,141 B2* | 4/2012 | Nakagaki et al. | 382/149 |
| 2004/0218806 A1 | 11/2004 | Miyamoto et al. | |
| 2004/0228515 A1 | 11/2004 | Okabe et al. | |
| 2004/0234120 A1 | 11/2004 | Honda et al. | |
| 2004/0252878 A1 | 12/2004 | Okuda et al. | |
| 2006/0078188 A1 | 4/2006 | Kurihara et al. | |

\* cited by examiner

NOTE: REFERENCE NUMERALS INDICATE ID

1001

1002

1104
1105
1103

| | | ATTRIBUTE 1605 |
|---|---|---|
| 1601 | SURFACE TOPOGRAPHY | ☑ CONVEX<br>☐ CONCAVE<br>☐ FLAT |
| 1602 | DEFECT POSITION | ☐ OVER BACKGROUND<br>☐ OVER WIRING<br>☑ BRIDGE |
| 1603 | PATTERN DEFECT | ☐ PATTERN DEFECT (NARROW)<br>☐ PATTERN DEFECT (OPEN)<br>☐ PATTERN DEFECT (WIDE)<br>☐ PATTERN DEFECT (SHORT) |
| 1604 | DEFECT TYPE | ☐ SURFACE PARTICLE (WHITE)<br>☑ SURFACE PARTICLE (BLACK)<br>☐ SCRATCH |

| ID | CLASS NAME | ATTRIBUTE | | | |
|---|---|---|---|---|---|
| | | SURFACE TOPOGRAPHY | DEFECT POSITION | PATTERN DEFECT | DEFECT TYPE |
| 1 | CLASS 1 | CONVEX | BRIDGE | — | SURFACE PARTICLE (BLACK) |
| 2 | CLASS 2 | CONVEX | OVER PATTERN | — | SURFACE PARTICLE (BLACK) |
| 3 | CLASS 3 | CONVEX | OVER BACKGROUND | — | SURFACE PARTICLE (BLACK) |
| 4 | CLASS 4 | CONVEX | BRIDGE | — | SURFACE PARTICLE (WHITE) |
| 5 | CLASS 5 | CONVEX | OVER PATTERN | — | SURFACE PARTICLE (WHITE) |
| 6 | CLASS 6 | CONVEX | OVER BACKGROUND | — | SURFACE PARTICLE (WHITE) |
| 7 | CLASS 7 | CONCAVE | BRIDGE | — | SCRATCH |
| 8 | CLASS 8 | CONCAVE | OVER PATTERN | — | SCRATCH |
| 9 | CLASS 9 | CONCAVE | OVER BACKGROUND | — | SCRATCH |
| 10 | CLASS 10 | — | BRIDGE | OPEN | — |
| 11 | CLASS 11 | — | OVER PATTERN | NARROW | — |
| 12 | CLASS 12 | — | BRIDGE | SHORT | — |
| 13 | CLASS 13 | — | OVER PATTERN | WIDE | — |

FIG.19

| # | NAME OF FEATURE VALUE | RELATIVE DEFECT ATTRIBUTE | CLASSIFIER TO BE USED |
|---|---|---|---|
| 1 | TOPOGRAPHIC FEATURE | SURFACE TOPOGRAPHY | RULE-BASED CLASSIFIER |
| 2 | POSITION BETWEEN DEFECT AND PATTERN | DEFECT POSITION | RULE-BASED CLASSIFIER |
| 3 | PATTERN DEFECT FEATURE | PATTERN DEFECT | RULE-BASED CLASSIFIER |
| 4 | DIMENSION OF DEFECT CONVEX-HULL | DEFECT TYPE | EXAMPLE-BASED CLASSIFIER |
| 5 | CIRCULARITY DEGREE OF DEFECT | DEFECT TYPE | EXAMPLE-BASED CLASSIFIER |
| 6 | DIRECTION OF DEFECT | DEFECT TYPE | EXAMPLE-BASED CLASSIFIER |
| 7 | AVERAGED BRIGHTNESS OF DEFECT | DEFECT TYPE | EXAMPLE-BASED CLASSIFIER |
| 8 | IMAGE EDGE STRENGTH OF DEFECT PORTION | DEFECT TYPE | EXAMPLE-BASED CLASSIFIER |
| ⋮ | ⋮ | ⋮ | ⋮ |

1901 — # 
1902 — NAME OF FEATURE VALUE
1903 — RELATIVE DEFECT ATTRIBUTE
1904 — CLASSIFIER TO BE USED

DEFECT CLASSIFIER USING CLASSIFICATION RECIPE BASED ON CONNECTION BETWEEN RULE-BASED AND EXAMPLE-BASED CLASSIFIERS

INCORPORATION BY REFERENCE

This application is a continuation of application Ser. No. 13/183,488, filed Jul. 15, 2011, now U.S. Pat. No. 8,150,141, which is a continuation of application Ser. No. 11/704,350, filed Feb. 9, 2007, now U.S. Pat. No. 7,991,217, which claims the benefit of Japanese Application No. JP 2006-049487 filed on Feb. 27, 2006, in the Japanese Patent Office, the disclosures of which are incorporated herein by reference.

BACKGROUND OF THE INVENTION

The present invention is related to a defect reviewing method and a defect reviewing apparatus, which are capable of reviewing various types of defects occurred in manufacturing processes for manufacturing semiconductor devices, liquid crystal panels, and the like, and are also capable of classifying the reviewed defects.

Since circuit patterns to be formed on semiconductor wafers in manufacturing steps of semiconductor devices are considerably made narrower and narrower, defects which happen to occur in these manufacturing steps may give strong impact on product yields. Thus, it is very important to manage that such defects are not produced in manufacturing stages. Generally speaking, in present manufacturing fields of semiconductor wafers, certain measures capable of improving manufacturing yields have been taken by employing wafer inspection apparatuses and reviewing apparatuses.

A wafer inspection apparatus is employed in order to check that a defect is located at which position on a wafer in a high speed. While a status of a wafer surface is processed as an image by employing either an optical imaging means or a means for irradiating an electron beam so as to image the wafer surface, the acquired image is automatically processed, so that the examining apparatus checks as to whether or not the defect is present on the wafer surface. In the examining apparatus with employment of the optical means, even though presence of a very small defect can be recognized from the detected image, due to a limitation in resolution restricted by a wavelength, a type of this defect can be hardly discriminated in detail. On the other hand, in the examining apparatus with employment of the electron beam, since the high-speed characteristic thereof constitutes the important factor, pixel sizes of an image to be acquired are made as large as possible (namely, resolution of image to be acquired is lowered) so as to reduce amounts of image data. In most cases, even though presence of a defect can be recognized from the detected image having such a low resolution, a type of this defect cannot be discriminated in detail.

On the other hand, a reviewing apparatus is such an apparatus used in order that as to each of defects detected by the inspection apparatus, an image thereof is imaged under such a condition that a pixel size is reduced (namely, under high resolution), and then, this imaged defect is classified. Presently, various sorts of reviewing apparatuses for manually performing, or automatically performing image acquiring process operations and image classifying process operations by way of computers have been commercially available. In these reviewing apparatuses, resolution of images, which is required for executing the classifying operations in sufficiently high precision, is determined based upon defects to be reviewed. In semiconductor manufacturing processes where very fine circuit patterns are made, while there are some possibilities that sizes of defects are reached to the order of several tens of nanometers, such reviewing apparatuses using scanning electron microscopes capable of reducing pixel sizes to several nanometers (will be referred as "review SEMs" hereinafter) have been utilized in an actual field.

As to technical ideas of defect classifications executed in the above-described review SEMs, conventionally, classifiers operable based upon rule bases, and example-based classifiers using statistical pattern recognizing manners are known. A rule-based classifier corresponds to such a system that while a classification rule has been previously formed by utilizing various sorts of natures owned by defects, a classification is carried out based upon this formed classification rule. The classification rule is determined by utilizing natures owned by defects (for instance, surface topograph of defect, shape (either round or rectangular shape) of defect, or dimension (either large or small) of defect). In other words, while the classification rule employs numeral data (will be referred to as "feature value" hereinafter) acquired by calculating the topography or the dimension in the quantitative manner, this classification rule performs the classification by judging as to whether or not a feature value calculated from a defect which should be classified can satisfy a basis defined by this rule.

Also, an example-based classifier operable based upon a statistical pattern recognition corresponds to a statistical classifier with employment of an exemplification sample. This statistical classifier implies the following classifier: That is, while a user has previously defined classes and has previously applied a plurality of sample defect data for each of these defined classes, and also the user has previously calculated various sorts of defect feature values (for example, brightness of defect image, image texture information of defect portion etc.) from these sample defect data, which are conceivable as effective feature values for classifying these defects, the user determines a classification basis (for example, distance in feature value space) based upon a statistical nature of this feature value data. Then, when a classification is carried out, the relevant defect is classified by comparing a feature value calculated from defect data which should be classified with the previously-formed classification basis.

A large number of classifying systems with employment of these classifiers have been developed to be marketed in various types thereof. For example, JP-A-2001-135692 describes such a classification technical idea constructed by combining rule-based classifiers with example-based classifiers. In accordance with this conventional technical idea, in the case that a defect to be classified is classified, first of all, this defect is classified by employing the rule-based classifiers, and thereafter, the defect is classified by using such an example-based classifier which corresponds to the relevant rule class. In general, in the case that a defect is automatically classified into a large number of classes (for example, 10, or more classes) by employing an example-based classifier, the following fact is known: That is, it is practically difficult to achieve sufficiently high performance. However, in the above-explained method, the example-based classifier employs only such classes adapted to the respective rule classification classes, which should be classified. As a result, the conventional classifying system has such a merit that a total number of classes which should be classified by the example-based classifier may be reduced to, for example, 2, or 3 classes.

SUMMARY OF THE INVENTION

In connection with complex degrees of semiconductor process steps, types and modes of defects occurred in manufacturing stages become complex, so that there is such a trend that a total number of classification classes required by users is increased. In this case, the conventional defect classifying technical ideas can hardly perform correct defect classifying operations.

FIG. 3 shows one example as to a definition of classes to be classified. In this example, as to surface particles (white), surface particles (black), and scratch defects, these defects related to positions thereof have been defined as 3 sorts (namely, bridge, over pattern, over background), whereas narrow pattern/wide pattern have been classified to 2 sorts (bridge/over pattern), so that 13 classes have been defined in total. In order to investigate an defect root cause specific to each of defects, such classifications (namely, classifications of surface particle (white), surface particle (black), and scratch) directed to defect types are required, whereas in order to observe that defects give influences to a device, classifications (bridge, over pattern, over background) at existing positions of the defects are required. This classification necessary reason is given as follows: That is, for example, even when a foreign article is present in a background portion, an impact caused by this defect and given to a yield is small. However, there is such a risk that a foreign article which is bridged over a plurality of circuit patterns may conduct a short, so that a large impact may be given to a yield. FIG. 3 exemplifies 13 classes as to the classification basis. In such a case that one type of defect in another mode (for example, foreign article whose texture is different) is newly added to a classification subject in a manufacturing process, if this foreign article is classified by considering a positional relationship with respect to the circuit patterns, then the classification basis is increased by 3, namely 16 classes in total. In other words, if a defect type is increased, then a classification class thereof is increased 3 times higher than 1 type of defect.

As explained in FIG. 3, in such a case that the large number of classification classes exceeding 10 classes are defined based upon the types of defects and the positional relationships thereof, it is practically difficult to realize such an ADC system capable of automatically performing the classifying operation in high precision and an easy manner. As previously disclosed in JP-A-2001-135692, there is such a merit that the rule-based classifiers are combined with the example-based classifiers in the defect classification, while the rule-based classifiers employ the foresighting feature of the defect (for example, section of defect is convex, or concave etc.), and the example-based classifiers utilize the statistical natures of the feature values of the defects. However, as explained in FIG. 3, when there are large numbers of classes, there is such a problem that a work for properly combining the rule-based classifiers with the example-based classifiers becomes cumbersome, namely, a cumbersome recipe setting operation is necessarily required. Also, every time the basis of the class is changed, and also, every time a classifying system is newly conducted to a manufacturing line, there is another problem that a lengthy time is necessarily required for setting these recipes.

The present invention has been made to solve the above-explained problems, and therefore, has an object to provide a defect reviewing apparatus featured by that while such a classifying means made by combining a rule-based classifier using a previously determined classification rule with an example-based classifier which can be arbitrarily exemplified by a user is provided, the connection between each rule-based class and example-based class thereof is automatically arranged based upon classification results of both the rule-based classifier and the example-based classifier with respect to a training sample.

Furthermore, a defect reviewing apparatus according to the present invention is provided with a means for defining a classification class and an attribute of a defect belonging to this classification class; and the connection between each rule-based class and example-based class thereof is automatically arranged based upon the classification results of both the rule-based classifier and the example-based classifier with respect to a training sample, and also, the information derived from this definition means. It should be understood that natures of the respective classification classes defined in the definition means imply, for example, a topography of a defect belonging to the relevant class, a positional relationship between a circuit pattern and this defect, a type of the defect, and so on.

In accordance with the present invention, even when a large number of classes to be classified are present, the connection between each rule-based class and example-based class can be automatically changed based upon the acquired training sample, and also, can be automatically changed by further employing the attribute information of the classification class defined by the user. As a consequence, even when there are large numbers of such classification classes, the recipe setting operation capable of realizing the high-precision classification can be carried out in an effective manner.

These and other objects, features and advantages of the invention will be apparent from the following more particular descriptions of preferred embodiments of the invention, as illustrated in the accompanying drawings.

BRIEF DESCRIPTION OF THE DRAWINGS

FIG. 17 is a diagram indicates an example as to attributes which have been defined based upon respective classification classes.

FIG. 19 shows an example as to a display screen of the input/output unit, which displays a list of features employed in classifying process operations, and attributes of these features.

DESCRIPTION OF THE INVENTION

Referring now to drawings, embodiments of the present invention will be described.

Embodiment 1

Figure 1:
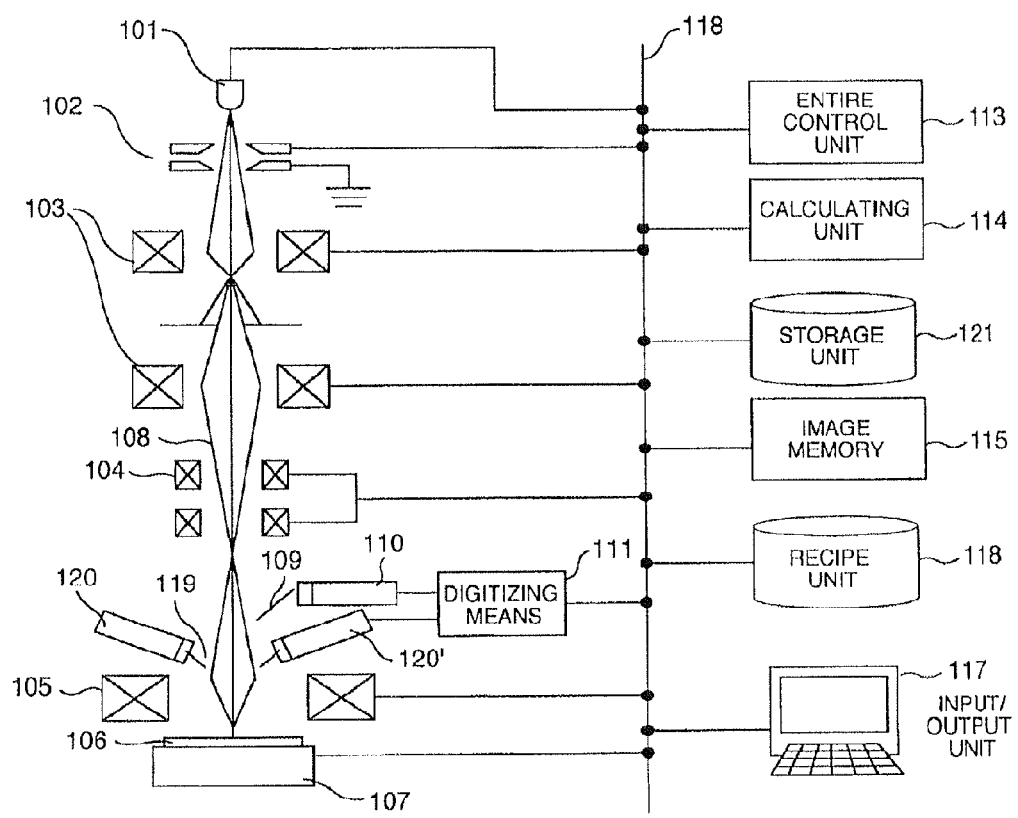
FIG. 1 is a structural diagram according to the present invention.

A description is made of a defect reviewing apparatus (namely, review SEM) with employment of a scanning electron microscope, according to a first embodiment of the present invention, and an automatic classifying process operation with respect to a defect on a semiconductor wafer using the review SEM. FIG. 1 schematically shows an arrangement of the review SEM. In FIG. 1, reference numeral 101 indicates an electron source used to generate a primary electron 108, reference numeral 102 represents an accelerating electrode used to accelerate the primary electron 101, reference numeral 103 indicates a converging lens used to converge the primary electron 101, reference numeral 104 shows a deflector which two-dimensionally scans and deflects the primary electron 101, and reference numeral 105 indicates an objective lens used to focus the primary electron 101 on a sample 106. Also, reference numeral 107 indicates a stage which mounts thereon the sample 106.

Reference numeral 110 shows a detector which detects a secondary electron signal 109 generated from the sample 106, and reference numeral 120 shows a back-scattered electron detector which detects a back-scattered electron signal 119. In this drawing, two sets of the above-described back-scattered electron detectors 120 have been installed in an opposite manner so as to detect difference components of back-scattered electrons 119 respectively, which are radiated from the sample 106. Further, reference numeral 111 shows a digitalizing means used to digitalize a detected signal. These structural units have been connected via a bus 118 to an entire control unit 113. In addition, an image memory 115, a calculating unit 114, a recipe unit 116, an input/output unit 117, and a storage unit 121 have been mutually connected via the bus 118 to this review SEM. The image memory 115 stores thereinto image data. The calculating unit 114 performs ADR/ADC processing operations (namely, image processing operation and classifying process operation) with respect to an acquired image. The recipe unit 116 stores thereinto recipes which have stored examination conditions, and the like. The input/output unit 117 is constituted by devices such as a keyboard and a mouse which are employed in order to give an instruction with respect to the review SEM, and also by a monitor and a printer, which output data supplied from the review SEM.

Figure 2:
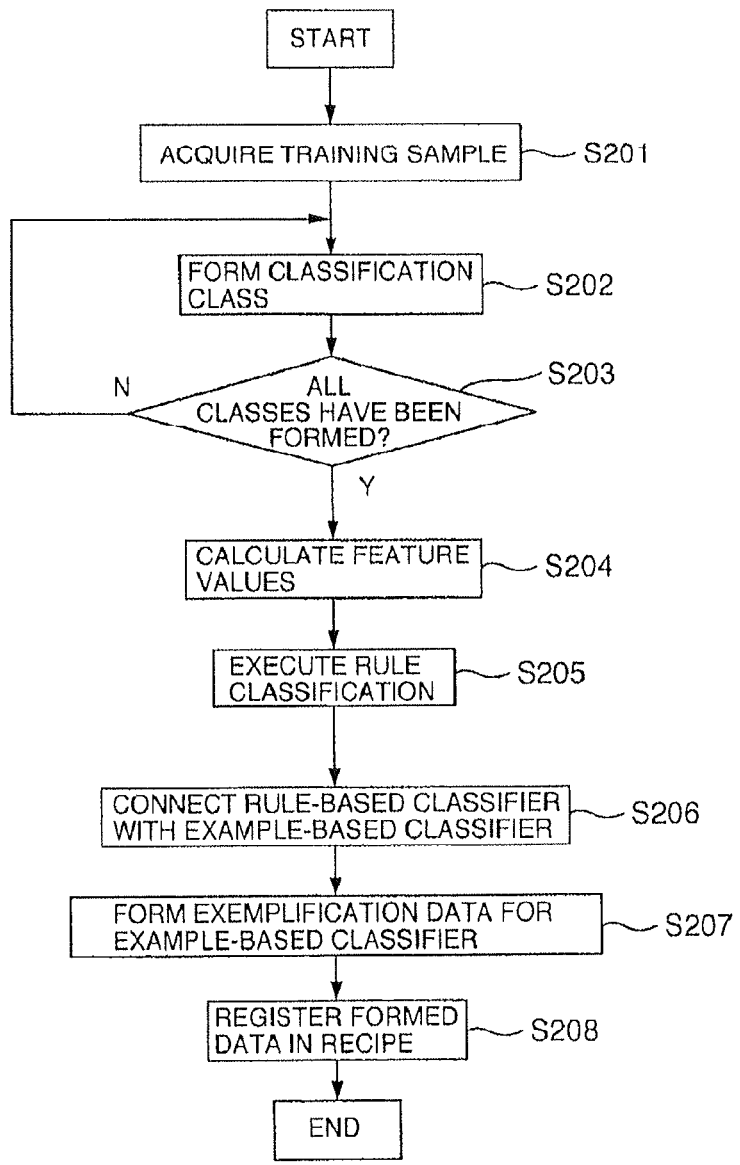
FIG. 2 is a flow chart for describing process operations for forming exemplification data.

Firstly, a description is made of an automatic classification-purpose recipe setting work executed in the defect reviewing apparatus according to the first embodiment with reference to FIG. 2. A purpose of this recipe setting work is given as follows: That is, while a classification reference which has been previously defined as indicated in, for example, FIG. 3 in a semiconductor wafer manufacturing field, or the like is set on this defect reviewing apparatus (exemplifying classification), an internal classifier (rule classifier) is arranged so as to be adapted to this classifying reference. The work for setting this exemplifying classification is carried out by an operation of the defect reviewing apparatus by manipulating the input/output unit 117 (namely, both input apparatus such as keyboard and moues, and monitor for displaying result) in an interactive manner, or is carried out by the calculating unit 114 and the like provided in this defect reviewing apparatus in response to the instruction.

Firstly, in this flow chart, prior to setting of a recipe, a training image sample has been previously acquired (step S201). The training image sample is acquired as follows: That is, while a training sample acquisition-purpose semiconductor wafer is employed, this semiconductor wafer is inspected by a defect inspection apparatus so as to extract a defect from the inspected wafer and acquire positional information of this extracted defect, and then, the defect is imaged by the review SEM shown in FIG. 1 by employing the positional information of the extracted defect. The acquired training sample image data is stored in the storage unit 121.

Figures 3, 4:
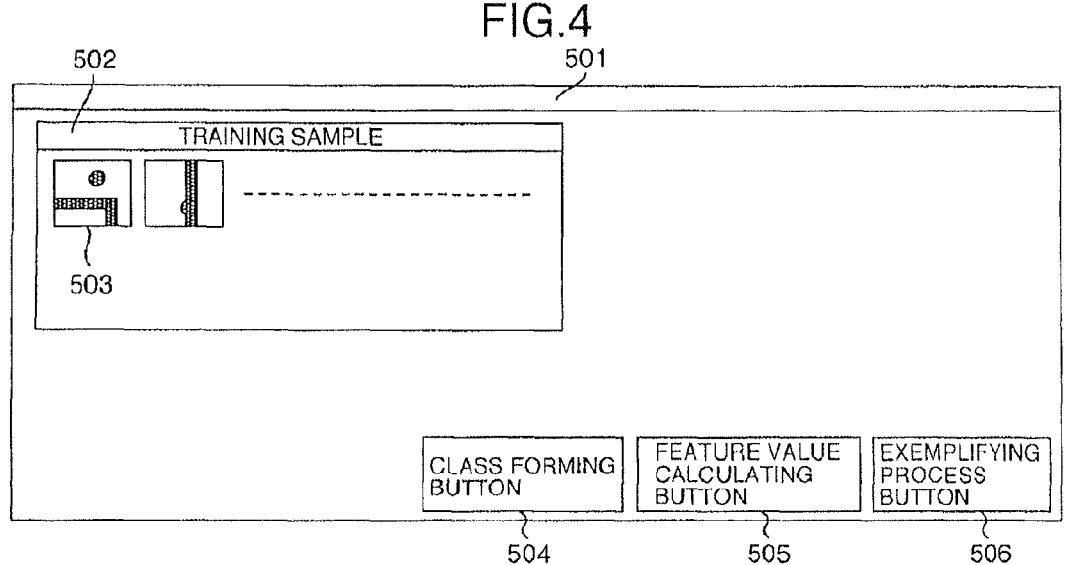
FIG. 3 illustratively represents a classification class definition example employed in a classifying apparatus.
FIG. 4 shows a display example of an input/output unit in an exemplifying sequence.

FIG. 4 schematically represents a GUI (Graphical User Interface) which is displayed on the input/output unit 117. Within a display window 501, a training sample display window 502 is present, and in addition, there are a class forming button 504, a feature value calculating button 505, and an exemplifying process button 506. The training samples stored in the storage unit 121 have been displayed in an array mode as training sample icons 503 within the training sample display window 502.

Figure 5:
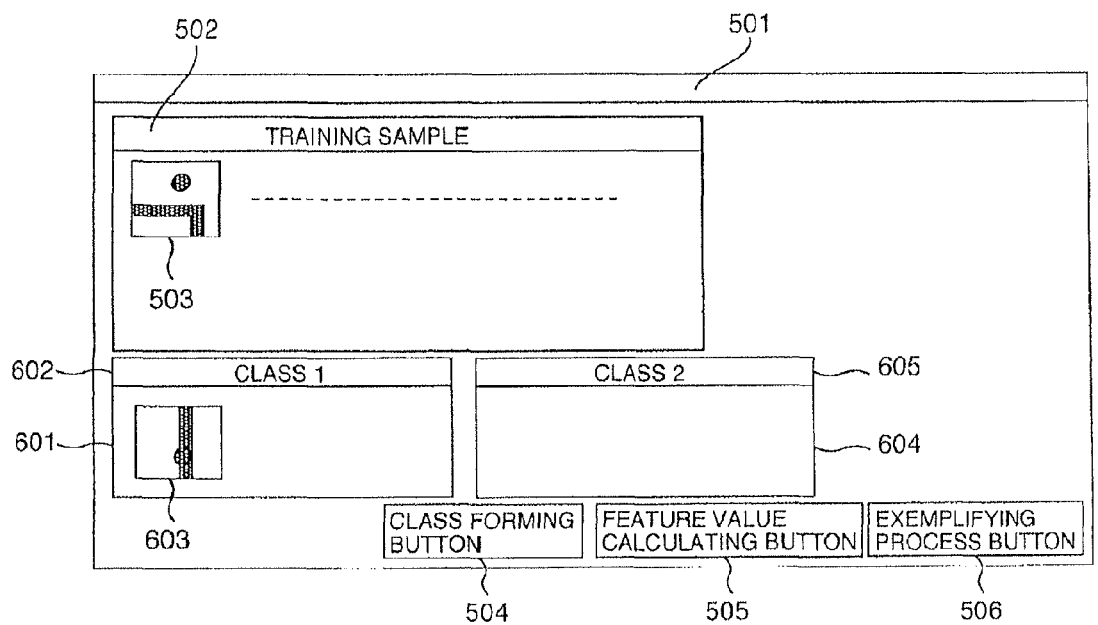
FIG. 5 indicates another display example of the input/output unit in the exemplifying sequence.

Next, the operator forms a class by employing the class forming button 504 (by clicking class forming button 504 by way of mouse) (step S202). In this case, as shown in FIG. 5, class windows 601 and 604 are formed in the window 501. These class windows 601 and 604 own class names 602 and 603, and functions capable of displaying an image icon 603. The operator sets a name of this class (in this drawing, class window 601 is set as "class 1", and class window 604 is set as "class 2"), and also moves a defect icon image from the exemplification window 501 of the image sample by a drag-and-drop manner. At a time when each of these icons has been moved to each of these classes by way of the drag-and-drop manner, a classification class has been applied to this sample. The operator repeatedly performs this class definition work unit all of the class windows are defined (step S203). In the example of FIG. 5, such a case is shown that two sets of the class windows are displayed. Alternatively, a total number of class windows may be increased in correspondence with a total quantity of classes to be classified. Furthermore, all of these class windows need not be displayed on the screen at the same time, but may be selectively displayed.

Figure 6A:
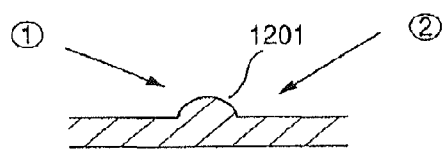
FIG. 6A is a sectional view of a sample, for representing such a condition that a defect 1201 such as a surface particle having a convex shape on a surface thereof has been attached.
Figure 6B:
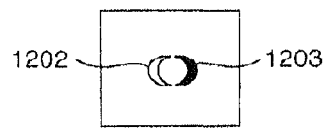
FIG. 6B shows an image acquired by imaging the sample along a direction (1) of FIG. 6A with respect to a visual field in order to execute a concave/convex recognizing process operation.
Figure 6C:
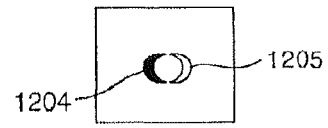
FIG. 6C shows an image acquired by imaging the sample along a direction (2) of FIG. 6A with respect to a visual field in order to execute a concave/convex recognizing process operation.

Next, numeral value data (feature value data) which represent features of respective defects are calculated from the respective training samples (step S204). This feature value calculating process operation is initiated by clicking the feature value calculating button 505 by the operator, so that the calculating unit 114 calculates feature value data with respect to the training sample data stored in the storage unit 121. The calculated feature value is stored in the storage unit 121. Major feature values calculated from an image correspond to a concave/convex status, a positional relationship between a defect and a circuit pattern, a pattern defect (pattern is made narrow, wide, open, and short) feature, a defect shape feature, a image brightness feature of a defect, an image texture of a defect, and the like. These items will be simply explained as follows:

A feature value indicative of the concave/convex status is calculated in the below-explained manner. This calculation employs back-scattered electron images obtained by detecting the back-scattered electron 119 by way of two pieces of the back-scattered electron detectors 120 and 120' located opposite to each other. FIG. 6A is a sectional view for representing a status of a sample on which a defect (particle defect) 1201 such as an attached particle has been attached, while the defect 1201 owns a convex shape on the surface thereof. FIG. 6B and FIG. 6C show images which are obtained by imaging the sample by the respective detectors 120 and 120' along either a direction (1) or another direction (2) of FIG. 6A with respect to a visual field, namely represents such a condition that shadows of the particle defect 1201 are produced along opposite directions. When a substance having a convex shape is observed by the back-scattered electron detectors 120 and 120' located opposite to each other along right/left directions in a scanning electron microscope, as represented in this drawing, as to FIG. 6B, such an image is acquired that a shadow appears along a direction similar to the forming direction of the shadow observed when illumination light is illuminated along the direction (1). In this shadow forming direction, a light component 1202 is observed on the side of the direction (1) of the convex-shaped substance, whereas a dark shadow 1203 is observed on the side of the direction (2). As to FIG. 6(C), both a light component 1205 and a dark shadow 1204 are produced along the opposite direction.

Figure 7A:
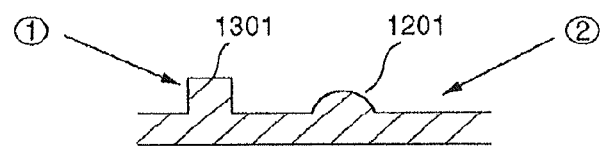
FIG. 7A is a sectional view of a sample where a circuit pattern 1301 having a surface topography, for representing such a condition that a defect 1201 such as a surface particle having a convex shape on a surface thereof has been attached.
Figure 7B:
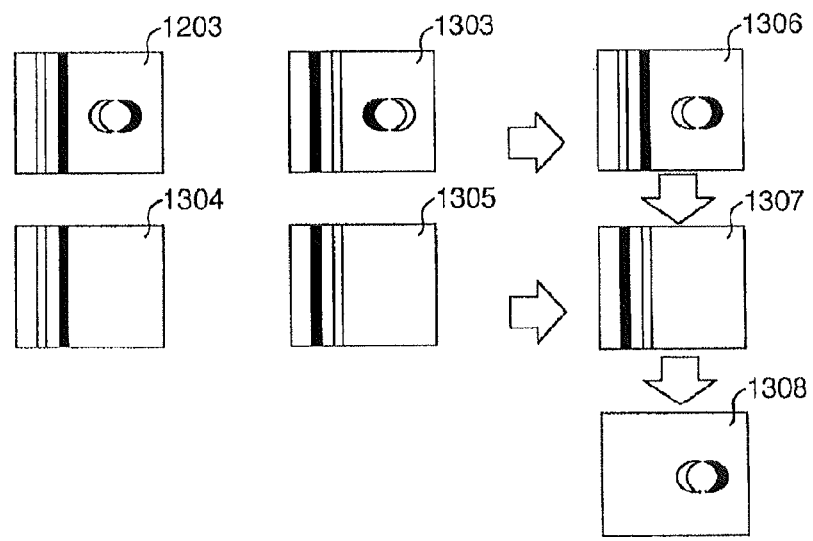
FIG. 7B shows an SEM image for explaining a flow as to a concave/convex recognizing process operation.

FIG. 7A and FIG. 7B illustratively show sequences as to a concave/convex recognizing process operation. As indicated as a sectional shape of FIG. 7A, a circuit pattern 1301 formed on an actual sample surface similarly owns a convex/concave shape. As a result, a shadow caused by the circuit pattern 1301 and a shadow caused by the particle defect 1201 are present on a back-scattered electron image in a mixed mode. Under such a circumstance, in order to judge concave and convex portions of a defect, it is required to realize such a process operation which is not adversely influenced by concave and convex portions of a pattern. Firstly, with respect to defect images (1302 and 1303) of a back-scattered electron, and synthesized reference images (1304 and 1305) which are obtained by performing a good pattern prediction with respect to a back-scattered electron image, difference images between right and left back-scattered electron images are calculated, so that images whose shadow portions are emphasized are acquired as to the defect image and the reference images (1306 and 1307). Next, a difference calculation between the two acquired images (1306 and 1307) is carried out so as to eliminate the concave/convex information owned by the circuit pattern of the background, and also so as to acquire such an image that the concave/convex information of the defect clearly appears (1308). Then, a direction along which an inclined surface of a shadow is present is checked from this acquired image, concretely speaking, a relative positional relationship between a white portion and a black portion of this drawing in order to judge as to whether this defect corresponds to a concave portion, or a convex portion. If the white portion is present on the right side of the black portion, then the defect corresponds to the convex portion. Conversely, if the black portion is present on the right side of the white portion, then the defect corresponds to the concave portion. Also, when both the black portion and the white portion are not present, and even if the black portion and the white portion are present, but areas thereof are small, then the sample surface is judged as a flat.

Figure 8A:
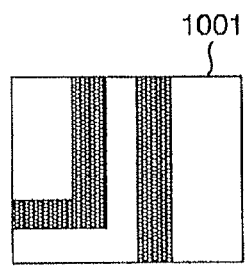
FIG. 8A shows an image (reference image) of such a portion that there is no defect where a pattern identical to a defect image has been formed.
Figure 8B:
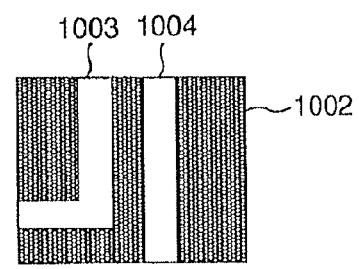
FIG. 8B represents a circuit pattern recognition result image obtained by that while a pattern portion is colored in white and a background is colored in black in the reference image of FIG. 8A, a binary process operation is carried out.

A feature value as to a positional relationship between a defect and a circuit pattern is calculated as follows: That is, this feature value calculation is to judge as to whether or not a defect portion is overlapped (bridged) with a circuit pattern after a circuit (wiring) pattern recognizing process operation has been carried out, while the circuit (wiring) pattern recognizing process operation is to check as to whether which portion within a visual field of a high magnification image corresponds to the circuit pattern, or the non-circuit pattern (namely, background). In the case that the defect portion is bridged with the circuit pattern, such a numeral value as "2" is calculated. In the case that the defect portion is not bridged with the circuit pattern, such a numeral value as "1" is calculated. When the defect portion is present on the background, such a numeral value as "0" is calculated. FIG. 8A and FIG. 8B represent concrete contents as to the circuit (wiring) pattern recognizing process operation. FIG. 8A shows an image 1001 (reference image) of such a portion that there is no defect where the same pattern as that of the defect image is formed. On the other hand, FIG. 8B represents a circuit (wiring) pattern recognition result image 1002, namely shows a result such that while utilizing such a fact that portions of circuit patterns 1003 and 1004 in the reference image of FIG. 8A are higher than a background portion, a binary process operation is carried out in such a manner that the circuit pattern portions 1003 and 1004 are white whereas the background portion is black. The result of this circuit (wiring) pattern recognizing process operation indicates that such an information as to whether each of the pixels of the reference image corresponds to a wiring line portion (circuit pattern), or a background for every pixel.

Figure 9A:
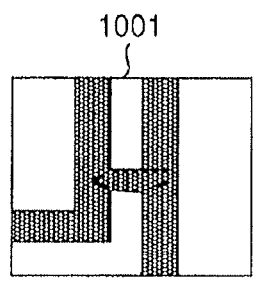
FIG. 9A indicates a defect image.
Figure 9B:
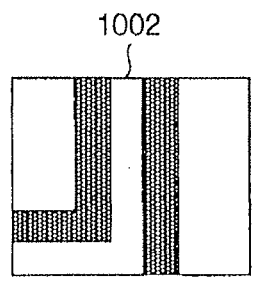
FIG. 9B shows a reference image.
Figure 9C:
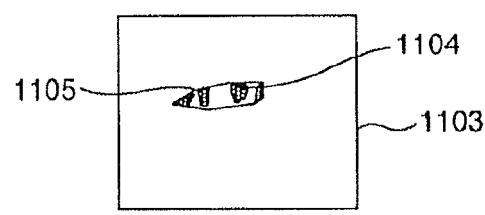
FIG. 9C represents a binary image which is formed by binary-processing a difference image between the defect image of FIG. 9A and the reference image of FIG. 9B.

A method for extracting a defect area will now be explained with reference to FIG. 9A to FIG. 9C. That is, firstly, a defect image 1101 of FIG. 9A is compared with a reference image 1102 of FIG. 9B so as to produce a difference image (not shown). Next, as represented in FIG. 9C, the difference image is binary-processed so as to form a binary image 1103; a convex-hull 1105 (namely, minimum convex polygonal shape which surrounds label) is calculated with respect to the obtained label 1104; and then, this convex-hull portion is defined as a defect area. The reason why this convex-hull calculation is performed is given as follows: That is, even when one defect is present, there are large possibilities that one defect may be detected as a plurality of labels, depending upon a positional relationship between this single defect and a pattern thereof, and also, a degree of noise mixed during image acquisition. Then, the image containing the calculated defect convex-hull 1105 of FIG. 9C is overlapped with the wiring pattern recognition result image 1002 of FIG. 8B so as to judge that the defect convex-hull 1105 is located at which position with respect to the circuit patterns 1003 and 1004. Then, for example, as to such a case that "the defect convex-hull 1105 is bridged over a plurality of wiring patterns", "2" is allocated; as to such a case that "the defect convex-hull 1105 is present over a single wiring pattern", "1" is allocated; and as to such a case that "the defect convex-hull 1105 is present over the background", "0" is allocated.

As to features of pattern defects (pattern is made narrow, wide, open, and short), a calculation is performed as follows: Although FIG. 8A and FIG. 8B represent the example as to the wiring recognition process operation with employment of the reference image, this process operation is also carried out with respect to a defect image. Then, the wiring recognition result of the defect image is compared with that of the reference image so as to judge a pattern defect. For instance, while an attention is paid to a peripheral portion of a defect portion, if a total number of circuit patterns is decreased due to an occurrence of a defect, then it is so judged that the circuit patterns are "short", whereas if a total number of circuit patterns is increased due to an occurrence of a defect, then it is so judged that the circuit patterns are "open". Then, different numeral values are allocated thereto in response to the respective modes (pattern is made narrow, wide, open, and short).

Also, as to feature values such as other defect shape features, image brightness features of defects, and image textures of defects, the below-mentioned calculations are carried out. For instance, as shape features, a dimension of a defect, a circular degree thereof, which are calculated from a convex-hull of this defect, a long axial direction of an approximated ellipse, and the like are calculated. Similarly, as brightness features of images and texture features, an image edge strength, and an average value of gradation values as to secondary electron images within area of this convex-hull are calculated.

Thereafter, while the calculated feature values are employed, as to the training sample image data saved in the storage unit 121, a classification is carried out by employing a rule classifier (will be explained later) which has been previously registered in the calculating unit 114 (step S205).

Subsequently, a connecting process operation (step S206) of a rule/example-based classifier, and an exemplification data forming operation (step S207) for the example-based classifier are carried out. A series of the above-explained process operations is commenced by clicking the exemplifying process button 506, and is executed with the calculating unit 114.

Figure 10:
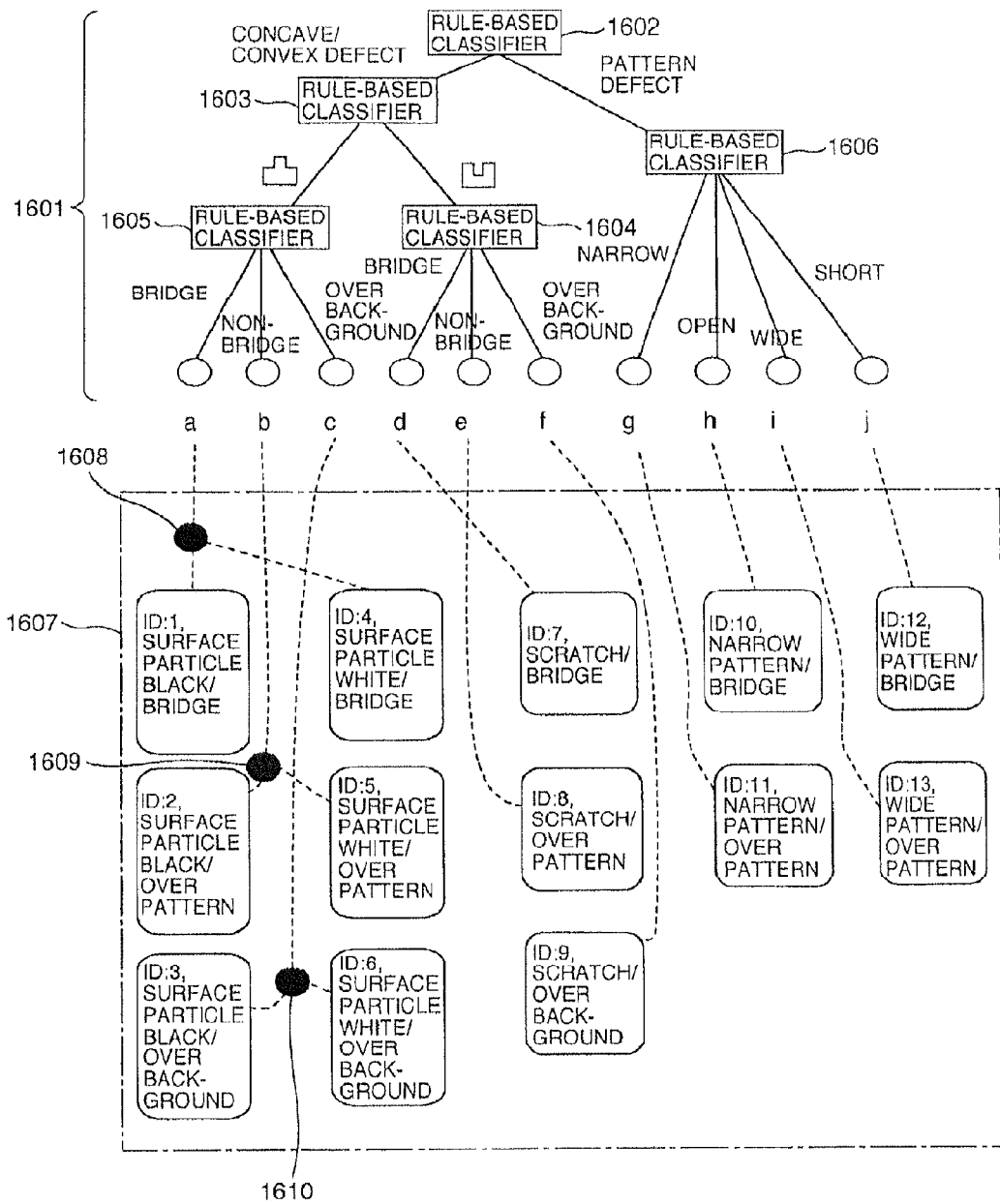
FIG. 10 is a block diagram for schematically showing a classifying system.

FIG. 10 schematically represents a classifying means which is constructed by connecting rule classifiers 1602 to 1606 with an example-based classifying unit 1607, and is owned by the defect reviewing apparatus according to the first embodiment. A tree 1601 located at an upper stage of FIG. 10 shows a classification tree of the rule classifiers 1602 to 1606, and it is so assumed that this rule has been previously registered in the recipe unit 116 of the defect reviewing apparatus. The classifying rule shown in this drawing firstly judges as to whether or not a relevant defect is a pattern defect (1602), and when this defect does not correspond to the pattern defect, the classifying rule judges as to whether or not this defect owns which nature of concave and convex (1603). Furthermore, the classifying rule judges as to whether or not a relationship between each of the defects and a wiring pattern corresponds to any one of a bridge, a non-bridge, and over a background (1604 and 1605). Also, in the case that the classifying rule judges that a defect is the pattern defect, the classifying rule judges as to whether or not this defect corresponds to any one of a narrow pattern, a wide pattern, an open pattern, and a short pattern (1606). In other words, these rule classifiers 1602 to 1606 classify 10 classes defined from "a" to "j" shown in FIG. 10.

On the other hand, a lower stage of FIG. 10 describes classification classes (13 classes shown in FIG. 3: exemplification data) of the example-based classifying unit 1607, which are wanted by the user of the defect reviewing apparatus defined in the previous step S202. Under this condition, since a correspondence relationship between the classes of the rule classifiers 1602 to 1606 and the classification classes (ID:1 to ID:13) of the example-based classifying unit 1607 has not yet been defined, the calculating unit 114 subsequently defines the correspondence relationship and the classes of the example-based classifier, and forms exemplification data.

Concretely speaking, firstly, the calculating unit 114 performs a rule classification by employing a feature value of each of the training samples with respect to each of the training samples acquired in the step S201 of FIG. 2. The information for indicating that the respective training samples belong to which classification classes has been acquired via the window shown in FIG. 4, so that since this rule classification is carried out, the correspondence relationship between the classes (namely, classes from "a" to "j") of the rule classifiers 1602 to 1606 to which the respective samples belong, and the classification classes (ID: 1 to ID:13) of the example-based classifying unit 1607 may be obtained. As a consequence, the classes of the rule classifiers 1602 to 1606 are coupled to the classification class of the example-based classifying unit 1607 by employing this correspondence relationship. For example, while a large number of training samples (for instance, 200, or more pieces of the training samples) are prepared, in such a case that with respect to the respective correspondence relationship between the classes ("a" to "j") of the rule classifiers 1602 to 1606 between the classification classes (ID:1 to ID:13) of the example-based classifying unit 1607, the relevant samples are present which are larger than, or equal to a certain reference number (for example, 5 pieces), the classes of the rule classifiers 1602 to 1606 are coupled to the classification classes (ID:1 to ID:13) of the example-based classifying unit 1607. In FIG. 10, this connection example is indicated by employing dotted lines. In this example, the following connecting condition can be seen: That is, the class "a" of the rule classifier 1605 has been coupled to two classes (namely, ID:1 and ID:4) of the classification classes of the example-based classifying unit 1607, and also, for example, the class "d" of the rule classifier 1604 has been coupled only to the classification class ID: 7 of the example-based classifying unit 1607.

Although not shown in FIG. 10, there is a certain possibility that the plural classes of the rule classifiers 1604 to 1606 are coupled to one classification class of the example-based classifying unit 1607 in such a case that the definition number of the classification classes (ID: 1 to ID: 13) of the example-based classifying unit 1607 is smaller that the classes of the rule classifiers 1602 to 1606. Also, when a certain calculation mistake happens to occur (namely, when defect extracting process operation fails due to noise) in a calculation stage for calculating a feature value required in a rule classification, for example, the following case is conceivable: That is, although a defect of a convex portion occurs, this defect is mistakenly judged as a concave portion. Even if such a calculation mistake happens to occur, then a connection relationship is defined in accordance with the judging results of the rule classifiers 1602 to 1606.

In the present classifying system, as described in the class "a" of the rule classifier 1605, if there is such a case that one class rule has been coupled to plural classification classes of the example-based classifying unit 1607, this classification is carried out by employing the example-based classifying unit 1607. As a consequence, the calculating unit 114 extracts such a case that one rule class of the rule classifiers 1602 to 1606 has been coupled to the plural classification classes of the example-based classifying unit 1607 from the connection relationship between the acquired classes classified by the rule classifiers 1602 to 1606 and the classification class of the example-based classifying unit 1607, and performs an exemplification data forming operation used for the example-based classifier 1607 (step S207). For instance, in the example shown in FIG. 10, an example-based classifier 1602 is used with respect to three sets of 2-class problems, namely, a classification problem with respect to the classification classes ID:1 to ID:4 of the example-based classifying unit 1607; a classification problem with respect to the classification classes ID:2 to ID:5 of the example-based classifying unit 1607; and also, a classification problem with respect to the classification classes ID:3 to ID:6 of the example-based classifying unit 1607; so that "exemplification data" of these example-based classifiers 1602 to 1606 are formed. In other words, in this example, exemplification data used for the 3 example-based classifiers 1608 to 1610 of the example-based classifying unit 1607 are formed by employing the training samples. The above-explained exemplification data implies that a classification reference of the relevant plural classes is statistically obtained from feature value data of training samples belonging to the relevant class. For example, as one example of concrete exemplification data, both an averaged value of a dispersed value of feature values are used which are calculated from feature values of defect samples belonging to the respective classes. In the case that such a defect is classified, and it is unknown that this defect belongs to which class, a feature value of the defect which should be classified is compared with exemplification data (namely, averaged value and dispersed value of feature values of respective classes), and then, such a class that the feature value thereof is statistically the nearest value is defined as a classification result.

The connection relationship between the classes ("a" to "j" in example of FIG. 10) of the rule classifiers and the classification classes (ID: 1 to ID: 13 in example of FIG. 10) of the example-based classifying unit, the relationship between the rule classifier classes to which the example-based classifier and the classification class of the example-based classifying unit, and the exemplification data forming results used for the respective example-based classifiers, which have been acquired in the previous process operations, are registered in the recipe unit 116 as classification recipes (step S208). The above-explained process operations correspond to the sequences for forming the exemplification recipes in the first embodiment.

Figure 11:
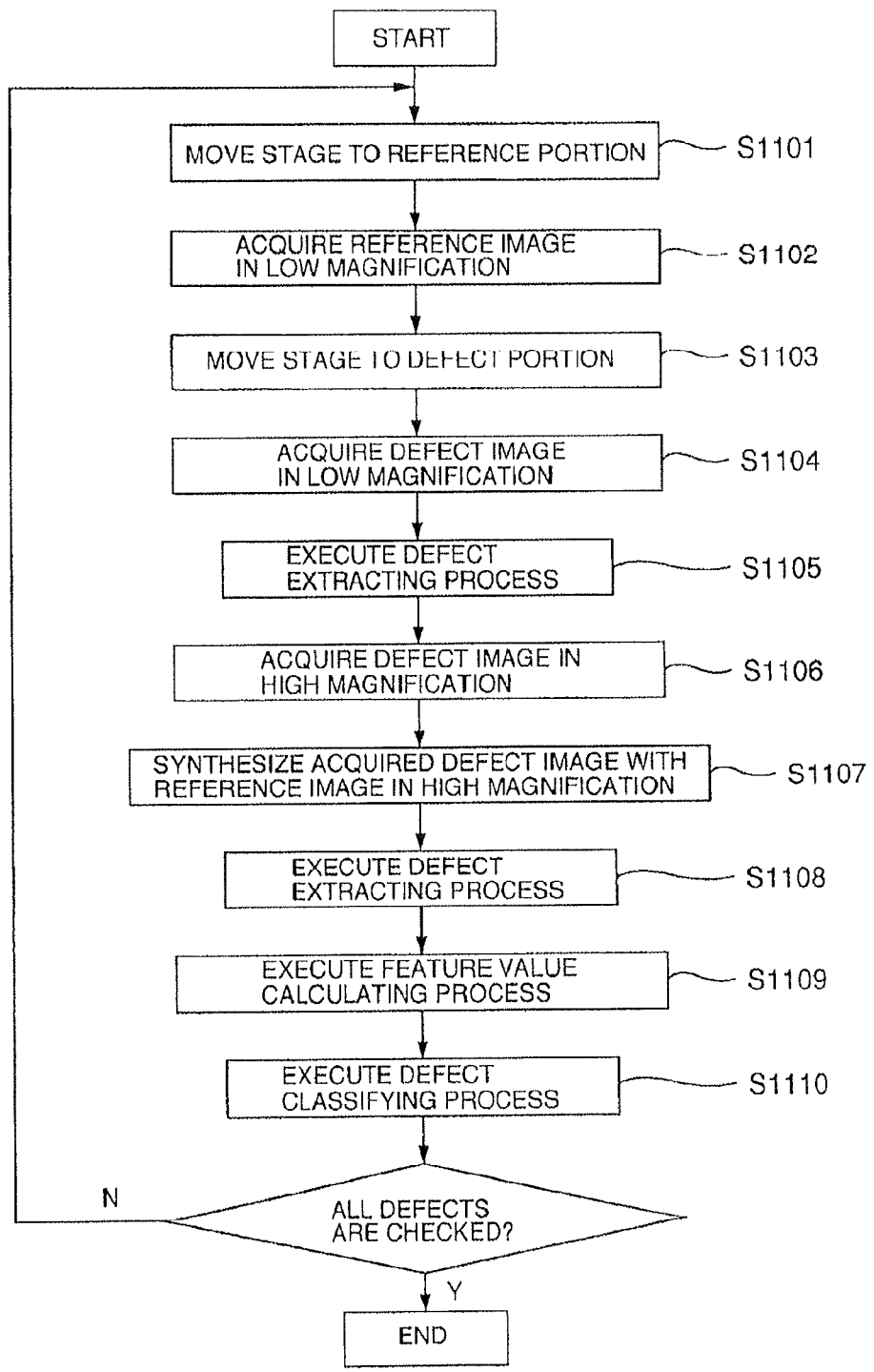
FIG. 11 is a flow chart for describing classifying process operations.

Next, a description is made of sequential process operations for automatically classifying a defect whose class is unknown with reference to FIG. 1 and FIG. 11. First of all, it is so assumed that before a classifying process operation is commenced, the sample wafer 106 has been mounted on the stage 107, and furthermore, both positional information of respective defects acquired by examining sample wafers by the outer view examining apparatus, and various sorts of electronic/optical system conditions (for example, accelerating voltage, probe current, imaging magnification etc.) when imaging operation is carried out have been stored in the recipe unit 116. Also, it is so assumed that the exemplification data whose forming method had been previously explained has been stored in this recipe unit 116. Normally, two sorts of magnification, namely low magnification (for example, approximately 10,000 times), and high magnification (for instance, approximately 50,000 times) are set as the imaging magnification set in the recipe unit 116. This magnification setting reason is given as follows: That is, in order to perform a process operation for classifying a very small defect, the imaging magnification thereof must be set to be higher than, or equal to approximately 50,000 times since such an image information capable of analyzing the subject very small structure is required. However, under such an imaging condition, the imaging visual field becomes narrower, and in the case that coincident precision between a coordinate of a defect detected by the examining apparatus and a coordinate of the microscope apparatus is deteriorated, it may be supposed that an imaging portion cannot be entered within the field of view. In this case, in the image acquiring process operation, namely in the ADR process operation, 2 steps of process operations, namely, (1) an image in a wide visual field in the low magnification is acquired, and then, a position of the defect is extracted within this wide image field of view; and (2) the extracted defect position is imaged in the high magnification.

The operator selects a recipe which is employed in a measurement from the plural recipes registered in the recipe unit 116 via the input/output unit 117, and instructs the entire control unit 113 to perform both the ADR and the ADC process operations under such a condition stored in this selected recipe. Also, if necessary, the operator instructs the entire control unit 113 so as to perform both the ADR and the ADC process operations only as to partial defect data which is selected from the defect data corresponding to the inspection result of the inspection apparatus stored in the recipe unit 116.

Acquiring process operations of a defect image by operating an SEM and process operations for processing the acquired image are carried out in accordance with such a flow chart shown in FIG. 11. First of all, the entire control unit 113 images an image (reference image) of such a portion that the same pattern as that of a portion of a subject defect on the sample wafer 106 with respect to the subject defects one by one based upon the coordinate data of the defects on the sample wafer 106, which are detected by the defect examining apparatus and have been stored in the storage unit 121. In the case of a semiconductor wafer, since the same circuit patterns are repeatedly formed on the semiconductor wafer, this acquiring process operation of the reference image may be realized as follows: That is, the sample stage 107 is moved in such a manner that while such a chip is employed which is located adjacent to a semiconductor chip where a defect is present, a portion whose present position is identical to that within the chip having the defect is entered in a visual field (step S1101), and then, this reference position is imaged (step S1102). It should also be noted that when patterns having the same shapes have been formed within a single chip, the same shaped pattern within the same chip may be alternatively imaged, and the imaged pattern may be employed as a reference image. The reference image obtained by the imaging operation is stored via the bus 118 into the image memory 115. In the image acquiring process operation, the primary electron 108 radiated from the electron source 101 is accelerated by the accelerating electrode 102, and thereafter, the accelerated primary electron 108 is converged by the convergence lens 103 and is further converged by the objective lens 105 so as to illuminate the converged primary electron 108 on a measuring portion of the sample wafer 106. In this case, the deflector 104 deflects the primary electron beam in such a manner that a visual field range which is determined based upon the magnification registered in the recipe is two-dimensionally scanned by the primary electron 108.

Both the secondary electron 109 and the back-scattered electron signal 119 which are generated from the sample surface by irradiating the primary electron beam onto the sample wafer 116 are captured by the secondary electron detector 110 and the back-scattered electron detectors 120 and 120', and are converted into photo-signals by a scintillator (not shown), and thereafter, are further connected into electric signals by a photomultiplier tube (not shown), and then, the electric signals are converted into digital signals by way of a digitalizing means (A/D converter) 111. The resulting digital signals are stored as a digital image via the bus 118 into the image memory 115. It should also be noted that in a scanning type electron microscope, since there are many shot noise such as secondary electrons generated from a sample, if the same portion is merely scanned only one time, then there are many possibilities that such an image having a sufficiently high S/N ratio cannot be obtained. As a consequence, normally, the scanning operation of the primary electron beam and the acquiring operation of the digital data are carried out plural times which are equal to scanning times (frame number) designated in the recipe, and thereafter, an averaged image as to these images is calculated so as to produce the image data.

Next, the stage 107 is moved (step S1103) based upon the coordinate data of the defect on the sample wafer 106, which is detected by the defect examining apparatus and has been stored in the storage unit 121 in order to image the defect portion, and then, an imaging operation of the defect is performed in the low magnification so as to acquire a defect image in the low magnification (step S1104). The calculating unit 114 performs a difference calculation between this defect image of the low magnification and the reference image which has been previously acquired to be stored in the image memory 15 in order to calculate a position of the defect, so that the defect extracting operation is carried out (step S1105). Next, while the extracted defect position is set as a center, an image is imaged in the high resolution (step S1106). At this time, since the defect is located within the visual field when the defect image of the low magnification is acquired, the scanning range of the primary electron 108 is controlled by the deflector 104 without moving the stage 107, so that a defect image can be acquired in the high magnification in such a manner that the defect extracted from the defect image of the low magnification is entered in the center of the visual field.

Next, a defect extracting process operation is carried out (step S1108). This defect extracting process operation is realized by executing a difference calculation between the defect image acquired in the high magnification and the reference image. In this sequence, while the reference image of the high magnification is not acquired, this reference image is formed by the calculating unit 114 (step S1107). Concretely speaking, within the reference image of the low magnification which has been previously acquired, such a portion whose visual field is identical to that of the image of the high magnification is formed by executing an image enlarging process operation. In the defect extracting process operation, such a difference image which has been obtained by performing the difference calculation between the defect image and the formed reference image is binary-processed based upon a proper threshold value, and then, the defect is extracted as such an area which is surrounded by convex-hulls of the acquired plural areas (labels). In an actual process operation, a defect label may be mistakenly detected due to such a reason that noise signals contained in images are slightly different from each other in a defect image and a reference image. As a result, for example, the following pre-process operation may be alternatively carried out: That is, since a threshold value process operation with respect to an area of a label is carried out, such a label having a small size may be deleted from a calculation subject of convex-hulls.

Next, a process operation for calculating a feature value is carried out in order to classify defects (step S1109). In this calculating process operation, similar to explained contents as to the exemplification data forming process operation, image feature values are calculated which represent a concave/convex status of a defect, a positional relationship between the defect and a circuit pattern, a dimension of the defect, a texture, and the like. Finally, a final featuring operation of the defects, namely, a defect classifying operation is carried out from various sorts of these feature value data (step S1110). This defect classification is performed in accordance with the system determined when the exemplification data is formed. For example, as represented in FIG. 10, an automatic classifying operation is carried out by combining a rule classifier with an example-based classifier. The classified result may be displayed on the display unit 117 in combination with the defect image thereof, or may be stored in the storage unit 121. Alternatively, the classified result may be transferred to another computer which is connected via a network to the defect reviewing apparatus. The previously explained classification sequences of the respective defects are continuously carried out until all of the defects to be reviewed are accomplished.

Embodiment 2

Next, a description is made of a defect reviewing apparatus according to a second embodiment of the present invention. In the previously explained first embodiment, when the connection relationship between the rule classifiers and the classification classes is acquired, the correspondence relationship between the classification classes applied to the training samples and the classification result of the samples in the rule classifiers is employed so as to define the connection relationship. It is so conceivable that this system owns the advantage in such a case that a sufficiently large number of training samples are provided. On the other hand, there is a problem in such a case that a small number of training samples are provided. For instance, among the acquired training samples, in such a case that there is only a small number of defect samples as to a certain classification class, there are some possibilities that a proper connection relationship with respect to this classification class may not be defined. It is conceivable that such a case readily occurs in connection with an increase of a total number of classification classes. The below-mentioned defect reviewing apparatus of the second embodiment may properly solve this problem. Concretely speaking, when classification classes are defined, while defect attributes owned by the respective classification classes are defined, connection relationships between the rule classes and the classification classes are defined by employing also this defined information. A first explanation is made of the second embodiment in that the attributes are defined with respect to the respective classification classes.

Figure 12:
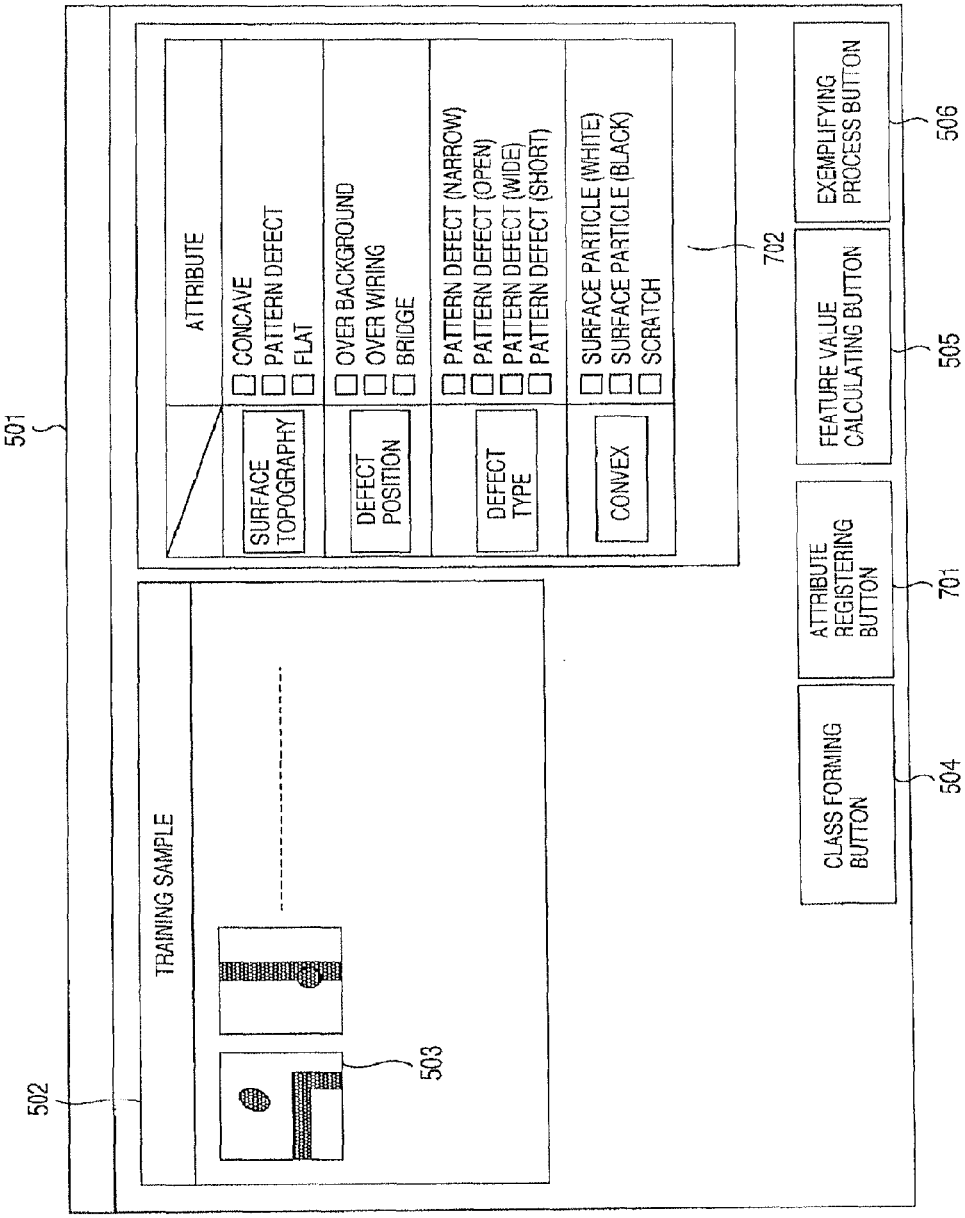
FIG. 12 shows another display example of the input/output unit in an exemplifying sequence.
Figure 13:
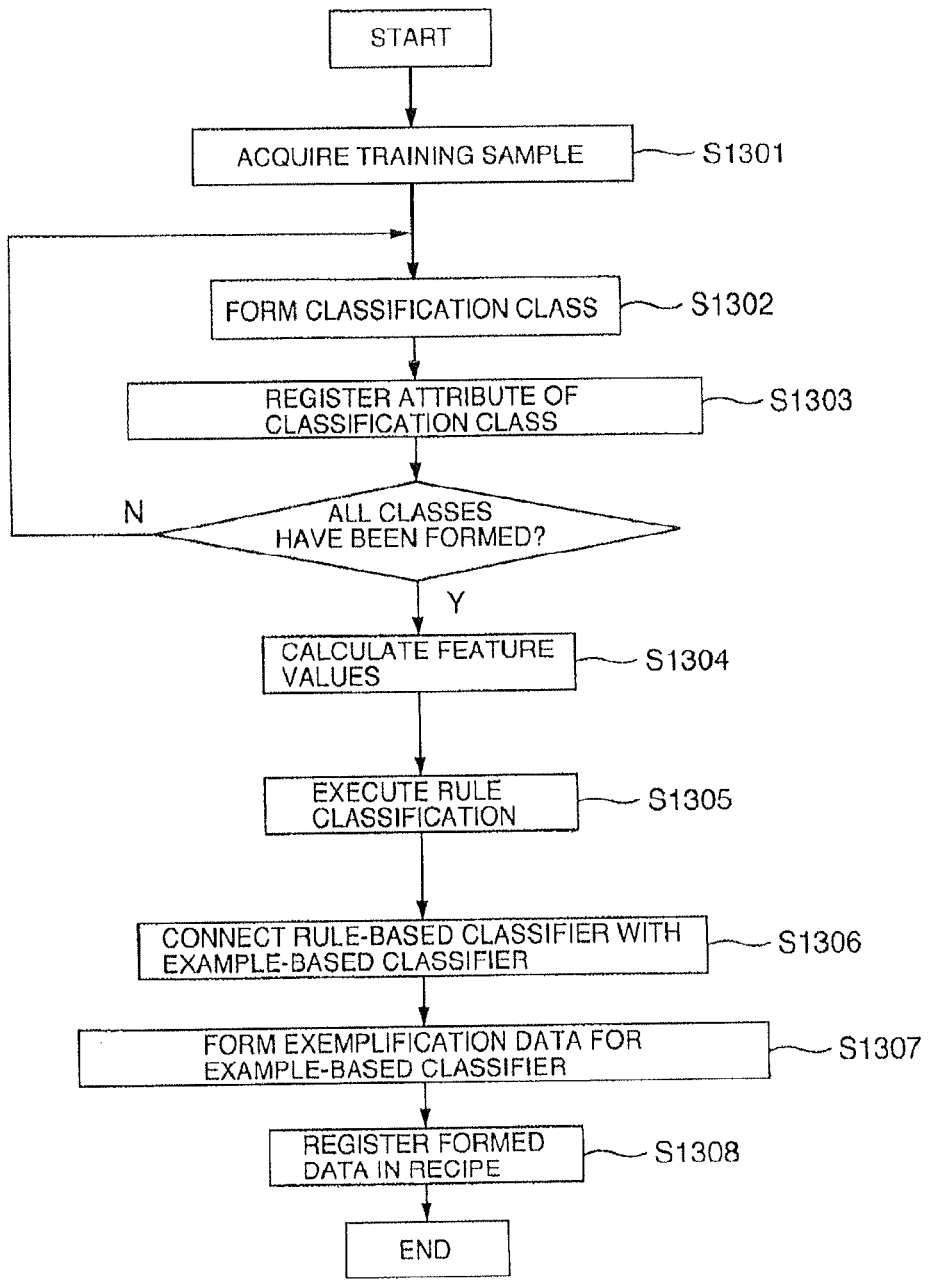
FIG. 13 is a flow chart for explaining process operations of forming exemplification data.

FIG. 12 schematically indicates a GUI (Graphic User Interface) displayed on the input/output unit 117 of the defect reviewing apparatus (FIG. 1) according to the second embodiment of the present invention. This window has the substantially same structure as the display window 501 shown in FIG. 4, and also has both a class attribute setting window 702 and an attribute registration button 701 as a different structure. FIG. 13 shows a recipe forming sequential operation with employment of the GUI of FIG. 13 in the second embodiment.

Figure 14:
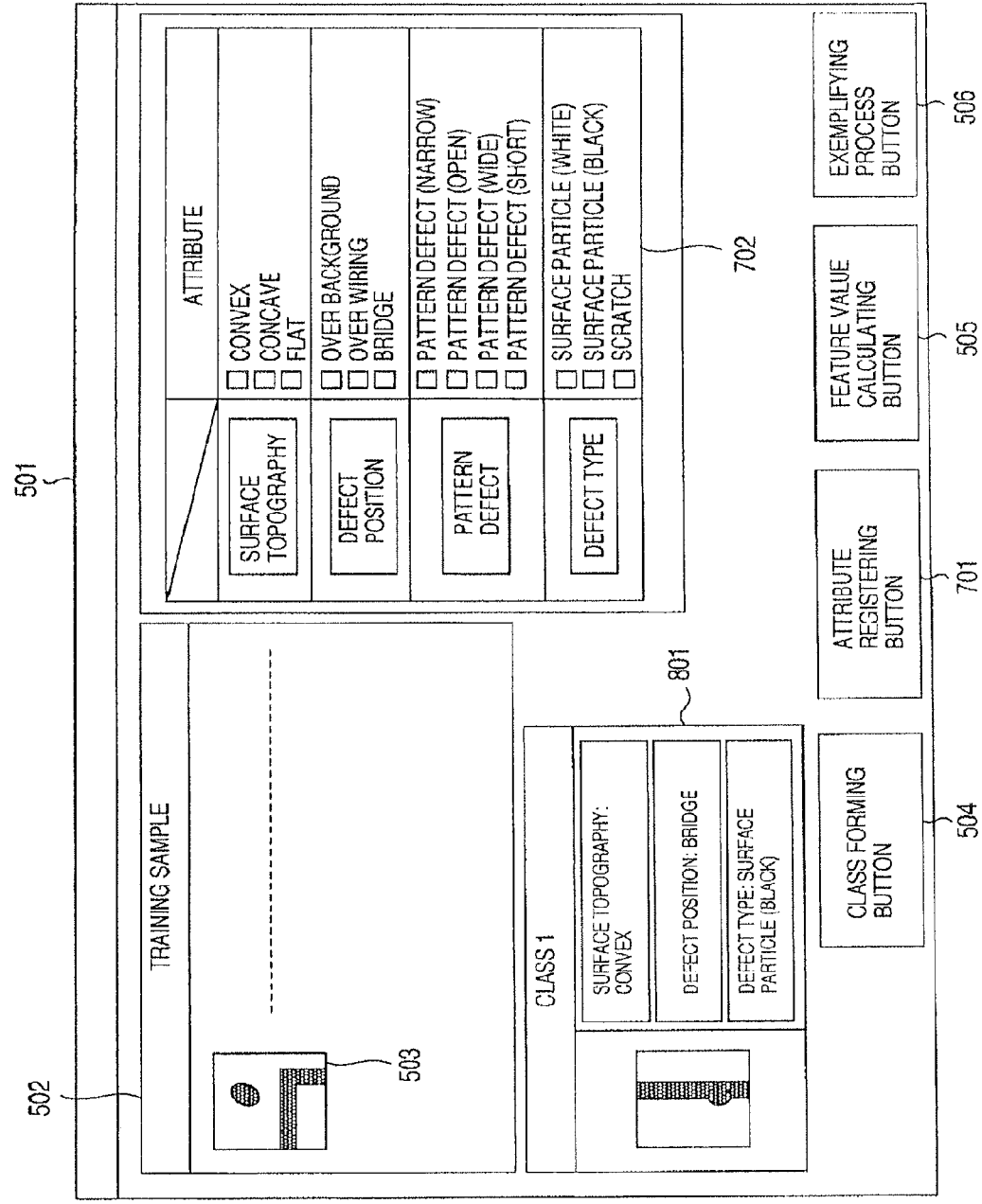
FIG. 14 shows another display example of the input/output unit in an exemplifying sequence.
Figures 15, 16:
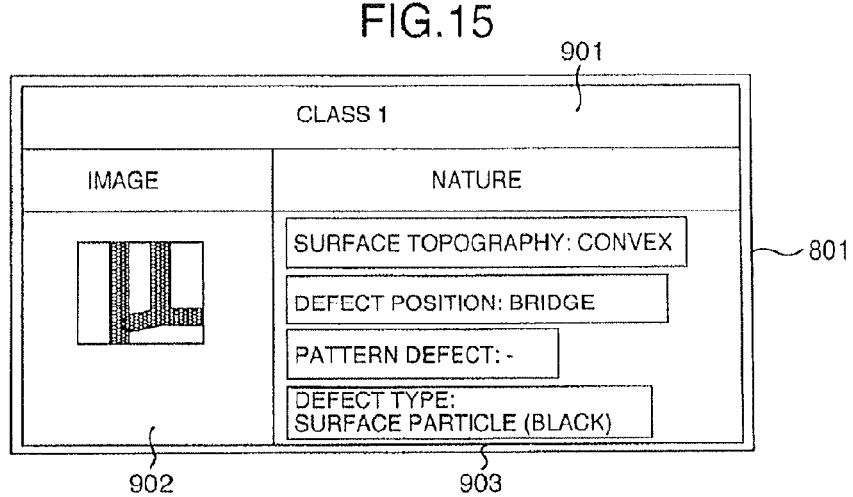
FIG. 15 indicates another display example of the input/output unit in the exemplifying sequence.
FIG. 16 shows another display example of the input/output unit in an exemplifying sequence.

In the recipe forming sequential operation of the second embodiment, first of all, prior to setting of the recipe, training image samples are acquired in advance based upon the same method as that explained in the flow chart of FIG. 2 (step S1301). Next, a classification class is formed by employing the class forming button 504 (by clicking class forming button 504 by way of mouse) (step S1302). In this case, within the window 501 of FIG. 12, a class window 801 shown in FIG. 14 is formed. FIG. 15 shows this class window 801 in an enlarge manner, while the class window 801 is constituted by a class name portion 901, an image display portion 902, and a defect attribute information portion 903. The operator sets a name of this class, and also, moves a defect icon image from the exemplification window 501 of the image sample by way of a drag-and-drop manner. The moved defect icon image is displayed on the image display portion 902.

Next, the operator sets a nature (attribute) of a defect with respect to this class (step S1303). This process operation is carried out in the below-mentioned concrete manner. FIG. 16 indicates the class attribute setting window 702 within the display window 501 in an enlarge manner. The class attribute setting window 702 displays a plurality of selection trees related to a nature (attribute 1605) of a defect with respect to a concave/convex status 1601 of the defect, a defect position 1602, a pattern defect 1603, and a defect type 1604. This class attribute setting window 702 owns a function capable of selecting these selection trees on the GUI. The operator selects attributes (for example, convex, bridge, surface particle (black) in this example) of the defect on the class attribute setting window 702, and thereafter, clicks the attribute registering button 701. As a result, the attributes of the defect with respect to the class 1 are registered. The defect attribute information portion 903 of FIG. 15 shows an example indicative of the set attributes. It should also be noted that the respective selection trees represented in FIG. 16 are separately provided with other devices capable of increasing/decreasing/changing the contents thereof in order to accept such a case that a new defect happens to occur.

The above-explained process operations are repeatedly carried out as to all of the classes which are defined by the user. When the attributes are set to each of the classes by performing this process operation, for example, with respect to the class definition shown in FIG. 3, an attribute (1703) with respect to a class (1702) for each of ID numbers (1701) is defined as shown in FIG. 17. This attribute table is stored in the storage unit 121.

Next, a feature value data which expresses a feature of each of the defects is calculated from each of the training sample (step S1304). This feature value calculation is carried out based upon the same method as the method described in the first embodiment. Since the operator clicks the feature value calculation button 505, this feature value data calculation is initiated, and thus, the calculating unit 114 performs the feature value calculation with respect to the training sample data stored in the storage unit 121. The calculated feature value is also stored in the storage unit 121.

On the other hand, as to the training sample image data saved in the storage unit 121, a classification is carried out by employing a rule classifier (will be explained later) which has been previously registered in the calculating unit 114 (step S1305). Next, a recipe registering operation (step S1308) is carried out by employing a connecting process operation (step S1306) of rule/example-based classifier and an exemplification data forming operation (step S1307) for an example-based classifier. A series of the above-described process operations is carried out within the calculating unit 114 in a similar to the process operations as explained in the first embodiment, while the process operations are commenced by clicking the exemplification process button 506. In this second embodiment, the attribute information of the respective classification classes registered in the step S1303 is also employed when the series of process operations are carried out. Concretely speaking, the below-mentioned process operations are carried out.

Figure 18:
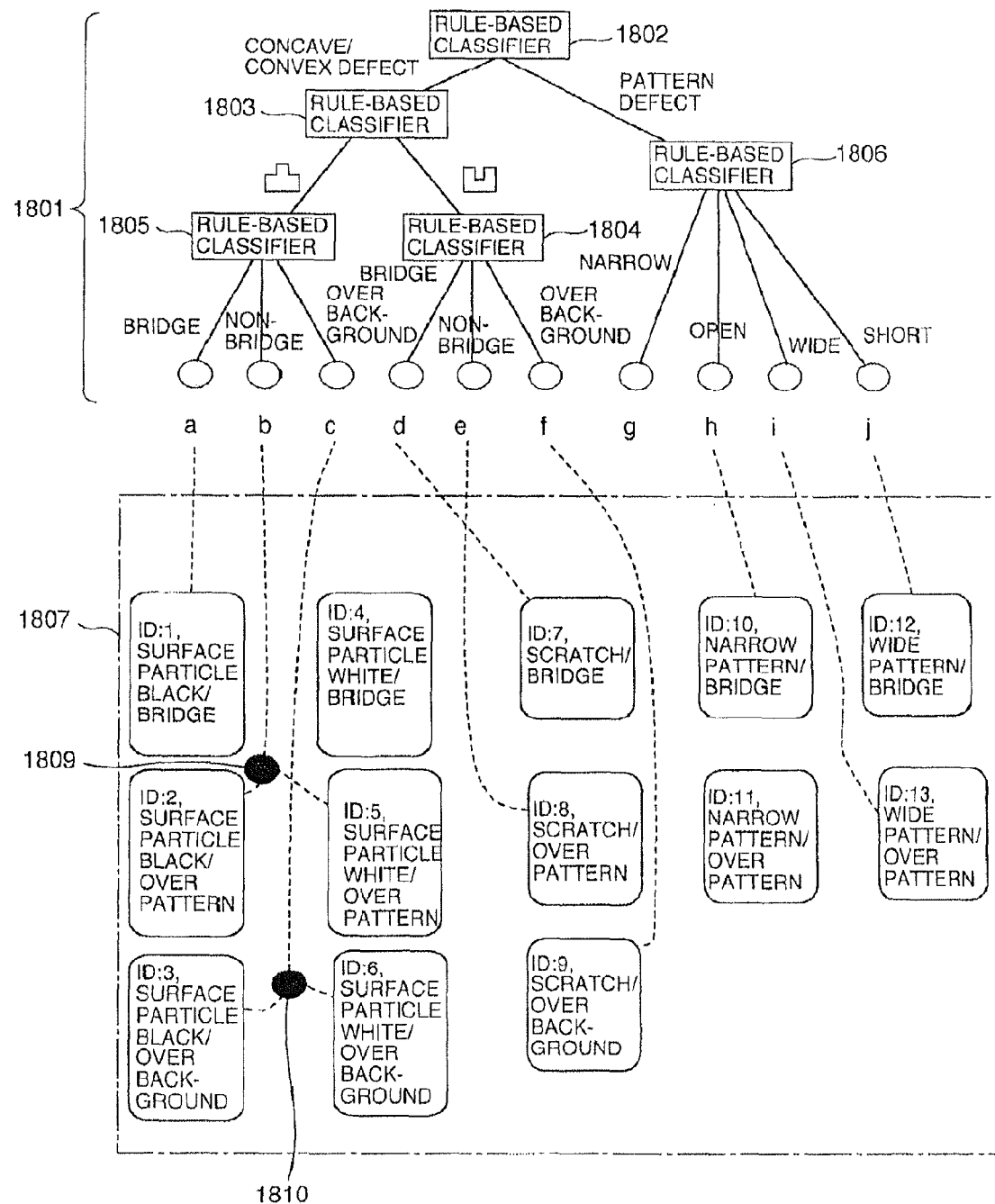
FIG. 18 is a block diagram for schematically showing another classifying system.

Similar to FIG. 10, FIG. 18 schematically shows a classifying system according to the second embodiment of the present invention. An upper stage of FIG. 18 indicates a rule classification tree 1801 provided with rule classifiers 1802 to 1806 and 10 sorts of rule classifier classes ("a" to "j"), whereas a lower stage of FIG. 18 represents classification classes 1807 (ID:1 to ID:13) defined by the user, and example-based classifiers 1808 and 1809. In this drawing, a connection relationship between classification classes (ID:1 to ID:13) and rule classifier classes ("a" to "j") is represented by a dotted line, which are acquired by employing the correspondence relationship between the rule classification results of the training samples and the classification class names as previously explained in the first embodiment. This drawing shows such an exemplification that a total number of training samples is small, namely, it can be seen that a total number of coupled classes is small, as compared with the connection relationship shown in FIG. 10. For example, there is no such a classification class which has been coupled to a narrow pattern defect (class "h") and a defect over background of a concave portion (class "f"); a bridge defect of a convex portion (class "a") is not coupled to ID:4, but has been coupled only to ID:1.

Next, the calculating unit 114 corrects the connection relationship as to the status shown in FIG. 18 by employing the attribute information of each of the classification classes indicated in FIG. 17. Firstly, the calculating unit 114 checks the relationship between the defect attribute (refer to FIG. 17) and the rule classifier classes ("a" to "j"), which are defined in the relevant classification class with respect to the respective classification classes, and if this attribute of the defect corresponds to a certain rule classifier class, then the calculating unit 114 couples these attributes and rule classifier classes to each other. Now, as to the rule classifier classes ("a" to "j"), the natures of the respective classes are conducted from the rule (for instance, class "a" owns such an attribute "convex and bridge"). As a result, this nature is compared with that of FIG. 17, so that the class "a" of the rule classifier classes is coupled to the classification class ID:4 in this example. Similarly, the class "f" of the rule classifier classes having such an attribute "concave and over background" is coupled to the classification class ID:9. Also, the class "h" of the rule classifier classes having such an attribute "pattern defect (narrowed pattern)" is coupled to the classification class ID:11.

Also, as the method of correcting the connection relationship, the correction may be carried out by employing a method for utilizing the actual feature value data in a quantitative manner in addition to the above-described information as to the qualitative defect attribute owned by each class. FIG.

19 represents a table which indicates a list of image feature values employed in this classifying system, which has been saved in the storage unit 121. This table is arranged by an item number column 1901, a feature value name column 1902, a relevant defect attribute column 1903, and a classifier column 1904 to be used. With respect to each of the feature values, an attribute of a defect whose feature value contributes a judgement is related thereto. For example, a concave/convex feature of the feature value name column 1902 corresponding to "#1" in the item number column 1901 implies that this concave/convex feature becomes advantage in the judgment "concave/convex status" from the relevant defect attribute column 1903. For example, the respective items described in the relevant defect attribute column 1903 correspond to the attributes of the defects defined with respect to the respective classes shown in FIG. 17.

A concrete sequence of the connection relationship correcting method is given as follows: That is, while an attention is paid to a concave/convex status, a defect position, and a pattern defect among the defect attributes defined with respect to each of the classification classes, the calculating unit 114 checks as to whether or not classes ("a" to "j") of each of the rule classifiers, and defines a connection relationship in the case that the relevant classes own the above-described natures. For example, it can be understood from FIG. 17 that the classification class ID:1 owns such an attribute "convex and bridge", and it can been seen from FIG. 19 that both a concave/convex status and a defect position are calculated based upon #1 and #2 of the feature values. As a consequence, the calculating unit 114 checks such values corresponding to the feature values #1 and #2 of FIG. 19 as to the corresponding training sample for each of the rule classifier classes ("a" to "j") of FIG. 18, and then, if there is a class whose trend of "convex and bridge" is emphasized, then this class is coupled to the classification class ID:1. As one example of this checking method, the following checking method may be conceived: That is, for example, while the feature values of #1 and #2 extracted from all of the training samples are expressed by a histogram, positions of samples belonging to the relevant class in this histogram are confirmed.

As previously explained, the correction for again defining the connection definitions by employing the actual feature value data has a merit in such a case that a mistake happens to occur especially in a rule classification. For example, in the example of FIG. 18, it is so assumed that some of surface particles (black) which should be originally defined as "convex and bridge" are mistakenly classified as the pattern defect (short) (class "j") in the rule classification. In the case that such an event number becomes small in the exemplification samples, the class "j" is not coupled to the classification class ID:1. However, if this connection status is still left, then in such the case that such a defect which should be originally classified as ID:1 during the actual operation is mistakenly judged as "pattern defect (short, class "j")" at the stage of the rule classifier, this result may necessarily cause the erroneous classification while the defect is not classified to ID:1. As a result, in the case that the class "j" can be judged that the attribute which should be owned by the defect of ID:1 owns the feature value level, it is desirable that the class "j" is previously coupled to the classification class ID:1.

Furthermore, the method for defining the connection relationship with respect to the classification classes 1807 (ID:1 to ID:13) by considering the feature value statuses of the defect samples classified to the respective classes (classes "a" to "j") of the rule classifiers 1802 to 1806 need not be applied to such a condition that the classification rules of the rule classifiers 1802 to 1806 are defined by employing the defect attributes (concave/convex status, defect position, and pattern defect in this example) as the reference, but may be applied even when any rules are employed. In other words, the definition method explained in this example can connect the classes to each other irrespective of the rule design reference as to the rule classifiers 1802 to 1806, while paying an attention to only such a relationship between the statuses of the sample feature values owned by the respective classes (class "a" to class "j") of the rule classifier classes, and the attributes of the classification class defined by the user.

Figure 20:
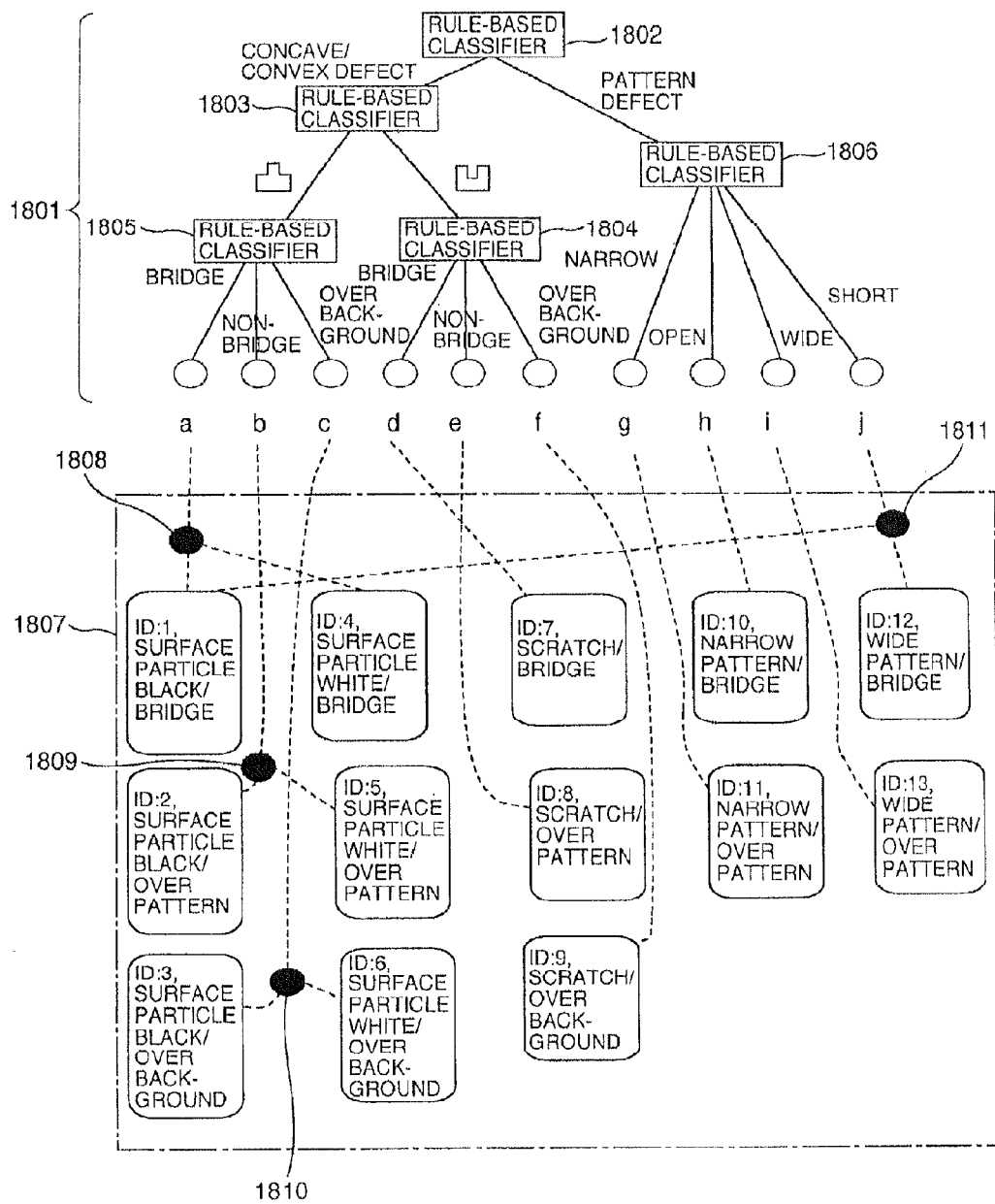
FIG. 20 is a block diagram for schematically representing another classifying system.

FIG. 20 indicates an example as to such a definition result that the connection relationship has been re-defined based upon the above-explained method with respect to the statuses of FIG. 18. As a result of re-defining the connection relationship, 4 sets of the example-based classifiers 1808 to 1811 are employed. It should be understood that in this example, when exemplification data for the example-based classifiers 1808 to 1810 among the classification classes ID:1 to ID:4 are formed, the training samples contained in the classification classes ID:2 to ID:5 (otherwise, ID:3-ID:6) are used. This reason is given as follows: That is, under the connection status shown in FIG. 18, the class "a" has not been coupled to both the classification classes ID:1 and ID:4. In other words, since the samples of the classification classes ID:1 and ID:4 are not present in a compatible manner, no training sample is present under this condition, so that the samples of other classes must be employed in a substitution manner. However, as apparent from FIG. 17, the classification classes ID:2 and ID:5 can be judged by that there are differences only in the defect types thereof, so that the training samples thereof may be employed in the example-based classifiers of the classification classes ID:1 and ID:4 whose defect types are different from each other.

The above-described contents correspond to the contents of the recipe setting process operation in the second embodiment. A process operation for automatically classifying such a defect whose class is unknown is carried out in a similar manner to the sequential operation shown in the first embodiment.

The first and second embodiments have explained such an example that the connecting operations between the classes of the rule classifiers and the classification classes are carried out in the automatic manner. Alternatively, even if the above-explained connecting operations may be carried out in a manual manner, a similar effect may be expected. In this alternative case, as described in the second embodiment, while the classification results of the training samples are employed, an initial status of a connection status is firstly acquired. Then, this status and statistical natures as to the feature values of the training samples contained in the respective rule classifier classes (classes "a" to "j") are displayed on the input/output unit 117, and thus, are corrected by the operator. Conversely, while such a status which has not yet been coupled to any classes is defined as the initial status, the operator may alternatively define a connection relationship with reference to the attributes of the classification classes, and the statistical natures of the feature values of the rule classifier classes.

Embodiment 3

Figure 21:
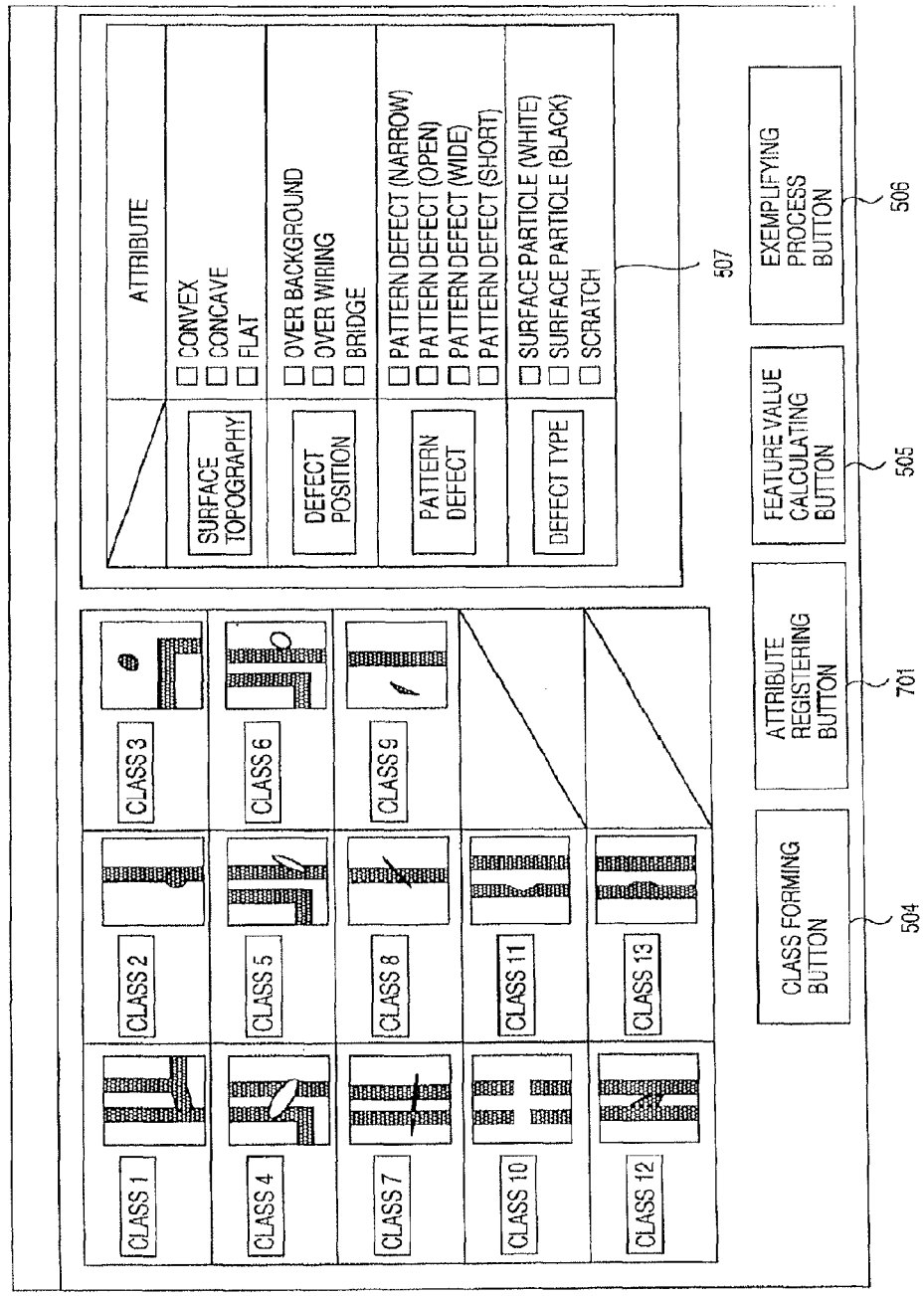
FIG. 21 is a diagram for indicating an example as to a structure of an exemplification screen.

Next, a description is made of an image classifying system according to a third embodiment of the present invention. The above-explained exemplifying process sequences of the second embodiment has exemplified such an example that as the method for registering the natures (attributes) of the defects belonging to the respective classification classes, as represented in FIG. 16, the plurality of names having the natures which are possibly set to the classification classes are indicated as the list so as to be selected therefrom. The purpose of this process operation is to acquire the correspondence relationship shown in FIG. 17 as to the set classification class and the attributes of the defects belonging to the set classification class. As a consequence, the concrete method of registering the natures (attributes) of the defects with respect to this classification class is not limited only to the above-explained method. For instance, after names of classification classes, and not only names, but also exemplification samples belonging to the respective classes have been registered, as shown in FIG. 21, these classification classes may be displayed as a list, and a plurality of classification classes may be selected so as to set an attribute. For example, in an example of FIG. 21, under such a condition that three classes, namely, a class 1, a class 2, and class 3 are selected at the same time, an attribute of a defect type "surface particle (black)" may be selected. Also, under such a condition that three classes, namely, a class 3, a class 6, and a class 9 are selected at the same time, "over background" may be alternatively registered to a position of a defect.

Embodiment 4

Figures 22, 23:
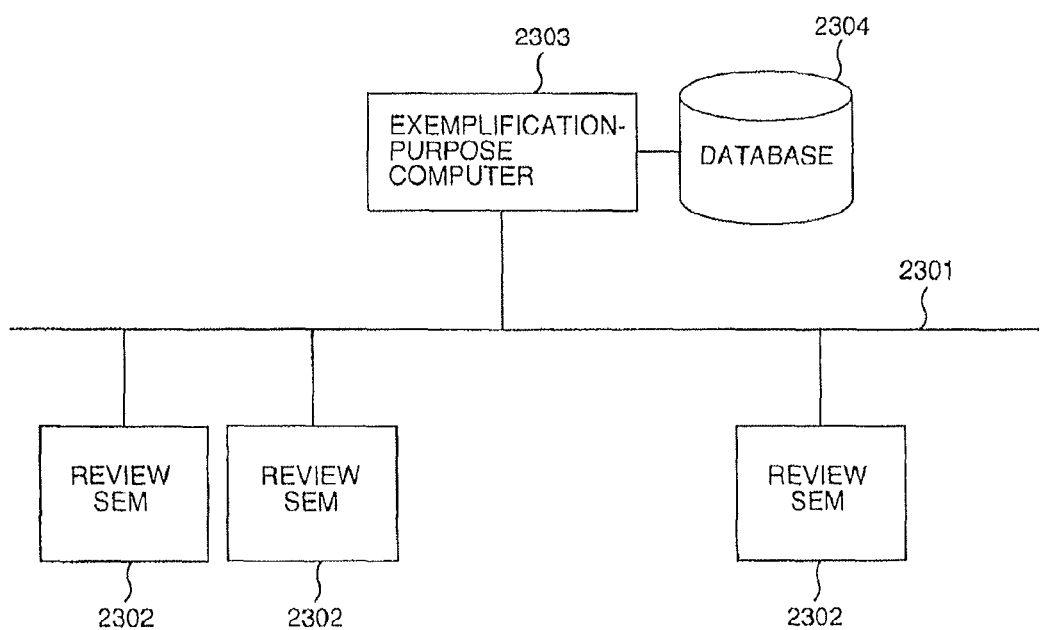
FIG. 22 is a diagram for indicating an example as to another structure of an exemplification screen.
FIG. 23 is a block diagram for schematically showing an example as to a network system structure of the classifying system.

Next, a description is made of an image classifying system according to a fourth embodiment of the present invention. The above-explained exemplifying process sequences of the first and second embodiments have exemplified such an example that while the image data of the training sample defects are acquired prior to setting of the classification classes, all of the acquired defect samples are arrayed within the same window so as to be displayed. However, in the case that a large number of exemplification-purpose samples are acquired, a large quantity of image icons are arrayed within the same window. As a result, visual recognizable characteristics of these image icons are deteriorated, resulting in a problem. The fourth embodiment of the present invention is to solve this problem, and is featured as follows: That is, after exemplification samples have been acquired, image feature values are calculated. Based upon the calculated image feature values, as indicated in FIG. 22, array positions within the exemplification sample window 502 are changed. As the feature values, such a feature value employed in a rule classifier may be employed, for instance, a feature value related to positional information between a defect and a circuit pattern, and concave/convex information of a defect may be employed. Before a defect sample is acquired, the internal area of the exemplification sample window 502 is subdivided into a plurality of sections by employing these feature values, for example, is subdivided in a matrix form constituted by defect positional information and defect concave/convex information. As to sample image data to be acquired, both defect position information and concave/convex information are extracted in accordance with the calculated feature values, and then, the acquired sample image data are displayed in an array form within the exemplification sample window 502 in accordance with this extracted result. As explained above, if the exemplification samples are displayed in the array form in response to the attributes thereof, even when a large number of defect samples (for example, 100, or more pieces of defect samples) are present, the visual recognizable characteristics of the defect images can be improved. Thus, the operator can easily find out such a defect having a desirable nature on the screen.

Embodiment 5

In the exemplification data setting process operations explained in the above embodiments, the classification classes are formed through the input/output unit 117 provided in the main body of the review SEM and the formed classification classes are stored in the recipe unit 116. In order to realize the present invention, the inventive idea thereof is not limited only to the above-explained example. For example, such a process operation that classification classes are set and/or exemplification classifying-purpose exemplification data are formed by employing acquired sample defect images may be alternatively carried out in a separate system which is connected to the review SEM via a high-speed network, or the like. FIG. 23 schematically shows this separate system in which a plurality of review SEMs 2302, and an exemplification computer 2303 for executing an exemplification process operation have been connected to a network 2301. While a database 2304 has been connected to the computer 2303, a large amount of image data acquired from the plural SEMs 2302 are stored in this database 2304. All of such exemplification process operations as setting of classification classes are carried out on this exemplification computer 2303, and then, the produced exemplification data are distributed to recipe units of the plural review SEMs 2302 which are connected to the network. It should also be noted that review SEMs 2302 which are connected in such a system need not be installed in the same production line, but may be installed in different manufacturing fields. In accordance with such a system, more larger numbers of exemplification samples may be effectively acquired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A defect reviewing apparatus comprising:
a scanning electron microscope;
classifier means made by connecting at least one rule-based classifier to at least one example-based classifier, said rule-based classifier classifying arbitrary image of a defect based upon at least one preset rule, and said example-based classifier classifying an image of the defect based upon information of examples of images;
connecting status correcting means for correcting a status of connection of said rule-based classifier and said example-based classifier based upon the classified result of the rule-based classifier and attribute information of the example of the images.

2. A defect reviewing apparatus as claimed in claim 1, further comprising:
input means for inputting attribute information of the defect classified by said example-based classifier of said classifier means.

3. A defect reviewing apparatus as claimed in claim 1, wherein:
   said attribute information of the examples of the images calculated contains any one of information related to a positional relationship between the defect and a circuit pattern, information related to a surface topography of the defect, and information related to a type of the defect.

4. A defect reviewing apparatus as claimed in claim 1, wherein:
   said scanning electron microscope images one pair of shadow images as an image of a sample.

* * * * *